(12) United States Patent
Tang et al.

(10) Patent No.: US 11,587,254 B2
(45) Date of Patent: Feb. 21, 2023

(54) RAYCAST CALIBRATION FOR ARTIFICIAL REALITY HEAD-MOUNTED DISPLAYS

(71) Applicant: Meta Platforms Technologies, LLC, Menlo Park, CA (US)

(72) Inventors: Huixuan Tang, Redmond, WA (US); Hauke Malte Strasdat, Kirkland, WA (US); Qi Guo, Cambridge, MA (US); Steven John Lovegrove, Woodinville, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 224 days.

(21) Appl. No.: 16/904,327

(22) Filed: Jun. 17, 2020

(65) Prior Publication Data

US 2021/0183102 A1 Jun. 17, 2021

Related U.S. Application Data

(60) Provisional application No. 62/948,000, filed on Dec. 13, 2019.

(51) Int. Cl.
*G06T 7/80* (2017.01)
*G06T 7/70* (2017.01)
*G06T 15/06* (2011.01)

(52) U.S. Cl.
CPC ............ *G06T 7/80* (2017.01); *G06T 7/70* (2017.01); *G06T 15/06* (2013.01); *G06T 2207/30244* (2013.01)

(58) Field of Classification Search
CPC .... G06T 7/80; G06T 7/85; G06T 7/70; G06T 15/06; G06T 2207/30244
See application file for complete search history.

(56) References Cited

U.S. PATENT DOCUMENTS

2017/0188021 A1\* 6/2017 Lo .................. H04N 13/322
2019/0086679 A1\* 3/2019 Ratcliff ............ H04N 13/344
2021/0191319 A1\* 6/2021 Christmas .......... G06F 3/012

OTHER PUBLICATIONS

Bimber et al., "Spatial Augmented Reality-Merging Real and Virtual Worlds," A.K. Peters, Ltd., 2005, 392 pp. (Applicant points out, in accordance with MPEP 609.04(a), that the year of publication, 2005, is sufficiently earlier than the effective U.S. filing date, so that the particular month of publication is not in issue.).

(Continued)

*Primary Examiner* — Robert J Michaud
(74) *Attorney, Agent, or Firm* — Shumaker & Sieffert, P.A.

(57) ABSTRACT

Raycast-based calibration techniques are described for determining calibration parameters associated with components of a head mounted display (HMD) of an augmented reality (AR) system having one or more off-axis reflective combiners. In an example, a system comprises an image capture device and a processor executing a calibration engine. The calibration engine is configured to determine correspondences between target points and camera pixels based on images of the target acquired through an optical system, the optical system including optical surfaces and an optical combiner. Each optical surface is defined by a difference of optical index on opposing sides of the surface. At least one calibration parameter for the optical system is determined by mapping rays from each camera pixel to each target point via raytracing through the optical system, the raytracing being based on the index differences, shapes, and positions of the optical surfaces relative to the one or more cameras.

20 Claims, 17 Drawing Sheets

(56) References Cited

OTHER PUBLICATIONS

Bohn, "Slamdance: inside the weird virtual reality of Google's Project Tango," May 2015. [Online]. Available: https://www.theverge.com/a/sundars-google/project-tango-google-io-2015 (retrieved Mar. 2, 2021), 6 pp.
Born et al., "Principles of Optics: Electromagnetic theory of propagation, interference and diffraction of light," (7th ed.), 1999, (title and table of contents) 10 pp. (Applicant points out, in accordance with MPEP 609.04(a), that the year of publication, 2005, is sufficiently earlier than the effective U.S. filing date, so that the particular month of publication is not in issue.).
Cobb et al., "Optical Design of a Monocentric Autostereoscopic Immersive Display," Proceedings vol. 4832, International Optical Design Conference 2002, Dec. 2002, Paper IMB5, 2 pp.
Flynn, "Colossal bust of Ramesses II," creative commons, Attribution-Non Commercial 4.0 International (CC BY-NC 4.0). [Online]. Available: https://sketchfab.com/3d-models/colossal-bust-of-ramesses-ii-v20-71355c314b2740e3814329f658a50917 (retrieved on Mar. 2, 2021) 6 pp.
Fry et al., "The center of rotation of the eye," American Journal of Optometry and Archives of American Academy of Optometry, vol. 39, No. 11, Nov. 1962, 15 pp.
Genc et al., "Practical Solutions for Calibration of Optical See-Through Devices," Proceedings International Symposium on Mixed and Augmented Reality, Oct. 2002, 9 pp.
Gilson et al., "Spatial calibration of an optical see-through head-mounted display," Journal of Neuroscience Methods, vol. 173, No. 1, Aug. 2008, 19 pp.
Grubert et al., "Comparative User Study of two See-through Calibration Methods," IEEE Virtual Reality Conference (VR), Mar. 2010, 2 pp.
Guo et al., "Raycast Calibration for Augmented Reality HMDs with Off-Axis Reflective Combiners," 2020 IEEE INternational COnference on Computational Photography (ICCP), Apr. 2020, 12 pp.
Hua et al., "Calibration of a Head Mounted Projective Display for Augmented Reality Systems," Proceedings International Symposium on Mixed and Augmented Reality, Oct. 2002, 10 pp.
Itoh et al., "Interaction-Free Calibration for Optical See-Through Head-Mounted Displays based on 3D Eye Localization," 2014 IEEE Symposium on 3D User Interfaces (3DUI), Mar. 2014, 8 pp.
Itoh et al., "Light-Field Correction for Spatial Calibration of Optical See-Through Head-Mounted Displays," IEEE Transactions on Visualization and Computer Graphics, vol. 21, No. 4, Apr. 2015, 10 pp.
Kim et al., "Foveated AR: Dynamically-Foveated Augmented Reality Display," ACM Transactions on Graphics, vol. 38, No. 4, Article 99, Jul. 2019, 15 pp.
Kim et al., "Supplementary Material for Foveated AR: Dynamically-Foveated Augmented Reality Display," ACM Transactions on Graphics, vol. 38, No. 4, Article 99, Apr. 2019, 22 pp.
Klemm et al., "Non-parametric Camera-Based Calibration of Optical See-Through Glasses for AR Applications," 2016 International Conference on Cyberworlds (CW), Sep. 2016, 8 pp.
Kooi et al., "Visual comfort of binocular and 3D displays," Displays, vol. 25, Aug. 2004, 10 pp.
Kooi et al., "Visual Comfort of Binocular and 3-D Displays," Proceedings of SPIE—The International Society for Optical Engineering, vol. 25, No. 2, Aug. 2004, 16 pp.
Kramida, G., "Resolving the Vergence-Accommodation Conflict in Head Mounted Displays," IEEE Transactions on Visualization and Computer Graphics, vol. 22, No. 7, Jul. 2016, 20 pp.
Lovegrove et al., "Spline Fusion: A continuous-time representation for visual-inertial fusion with application to rolling shutter cameras," British Machine Vision Conference (BMVC), Jan. 2013, 12 pp. Available: https://doi.org/10.5244/C.27.93.
Plopski et al., "Corneal-Imaging Calibration for Optical See-Through Head-Mounted Displays," IEEE Transactions on Visualization and Computer Graphics, vol. 21, No. 4, Apr. 2015, 10 pp.
Tuceryan et al., "Single point active alignment method (SPAAM) for optical see-through HMD calibration for AR," Proceedings IEEE and ACM International Symposium on Augmented Reality (ISAR 2000), Oct. 2000, 10 pp.
Wei et al., "Design and fabrication of a compact off-axis see-through head-mounted display using a freeform surface," Optics Express, vol. 26, No. 7, Apr. 2018, 16 pp.
Zernike, "Beugungstheorie des schneidenver-fahrens und seiner verbesserten form, der phasenkontrastmethode," Physica, vol. 1, Nos. 7-12, May 1934, and Abstract, 19 pp.
Zheng et al., "Design and fabrication of an off-axis see-through head-mounted display with an x-y polynomial surface," Applied Optics, vol. 49, No. 19, Jul. 2010, 8 pp.
"Calibu." [Online]. Available: https://github.com/arpg/Calibu (retrieved Mar. 2, 2021), 2 pp.
Dreamworld, Inc., "Dreamworld AR," 2019. [Online]. Available: https://www.dreamworldvision.com/ (retrieved Feb. 25, 2021), 4 pp.
Facebook, Inc., "From the lab to the living room: The story behind Facebook's Oculus Insight technology and a new era of consumer VR," Aug. 22, 2019. [Online]. Available: https://tech.fb.com/the-story-behind-oculus-insight-technology/ (retrieved Mar. 2, 2021), 15 pp.
Google Inc., S. Agarwal and K. Mierle, "Ceres Solver: Tutorial & Reference," retrieved from ceres-solver.org on Mar. 2, 2021, 1 pp.
Leap Motion, Inc., "Bending reality: North star's calibration system," 2019. [Online]. Available: http://blog.leapmotion.com/bending-reality-north-stars-calibration-system/ (retrieved Mar. 2, 2021) 8 pp.
Leap Motion, Inc., "Project north star: Mechanical," 2019. [Online]. Available: https://developer.leapmotion.com/northstar (retrieved on Feb. 5, 2021), 3 pp.
Meta View, Inc., "Meta: M vision," 2019. [Online]. Available: http://www.metavision.com (retrieved on Mar. 4, 2021), 1 pp.
Mira Labs, Inc., "Mira augmented reality," 2019. [Online]. Available: https://www.mirareality.com/ (retrieved Feb. 25, 2021), 7 pp.
Reality8, Inc., "Realmax 100 product information," 2019. [Online]. Available: http://realmaxinc.com/realmax-100-product-information/ (retrieved Feb. 25, 2021), 2 pp.

* cited by examiner

RAYCAST CALIBRATION FOR ARTIFICIAL REALITY HEAD-MOUNTED DISPLAYS

This application claims the benefit of U.S. Provisional Patent Application Ser. No. 62/948,000, entitled "RAYCAST CALIBRATION FOR ARTIFICIAL REALITY HEAD-MOUNTED DISPLAYS," and filed on Dec. 13, 2019, the entire content of which are incorporated herein by reference.

TECHNICAL FIELD

This disclosure generally relates to optical systems and, in particular examples, calibration of optical components within a head mounted display on an artificial reality system.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The HMD may include one or more components (e.g., image capture devices, illuminators, sensors, and the like) configured to capture images and other data used to compute a current pose (e.g., position and orientation) of a frame of reference, such as the HMD. The HMD selectively renders the artificial reality content for display to the user based on the current pose.

SUMMARY

In general, this disclosure describes raycast-based calibration of one or more components of a head mounted display (HMD) included in an artificial reality system, such as an augmented reality (AR) system having one or more off-axis reflective combiners. As further explained, HMD calibration techniques are described in which a physics-based model of the HMD is computed by mapping camera pixels to target points by tracing optical rays backward from the camera to the target, with such techniques being referred to herein as 'ray casting' calibration techniques.

In some example implementations of the techniques described herein, an optical system of the HMD includes at least one optical combiner that can redirect light from a first direction or a first range of directions that to a user's eyes and pass light without redirection from a second direction or second range of directions to the user's eyes, the second direction or range of directions being different from the first direction or first range of directions. In some examples, the optical combiner, or "combiner" for short, is partially transparent and partially reflective in the visible and/or infrared wavelength spectrum. Techniques of this disclosure include raycast calibration to reconstruct a physics-based model of the HMD, e.g. determining the pose (rotation and translation) and optical parameters (sag, thickness, refractive index, etc.) of one or more components of the HMD, including the combiner. In some examples, raycast calibration techniques include "raycasting," e.g. mapping camera pixels to target points via raytracing from camera pixels to target points through an optical system. In some examples, camera-to-target correspondences measured from a physical build of the HMD configured with eyeball calibration cameras estimate certain system optical parameters and may be utilized by raycasting to map camera pixels to target points. In some examples, raycasting may trace both visible and invisible camera pixels (e.g. invisible pixels are pixels for which rays cannot intersect with an optical surface on the light path from pixel to any point on the target).

The disclosed techniques may be applied to calibrate multiple different components of the HMD, including determining calibration parameters (e.g., intrinsic parameters, extrinsic parameters, relative pose, distortion, etc.) for image capture devices such as eye-tracking cameras and inside-out cameras, displays, illuminators, sensors, lenses, diffraction gratings, optical combiners, and the like. Moreover, the techniques may be particularly useful for calibration of augmented reality (AR) systems having one or more off-axis reflective combiner, e.g. a combiner in which the optical axis of the combiner is not coincident with its mechanical center, which tend to produce distortions using conventional camera models due to high non-linearity and asymmetry.

In one example, this disclosure is directed to a method of calibrating an optical system comprising determining a plurality of correspondences between a plurality of target points of a target and a plurality of camera pixels of one or more cameras based on one or more images of the target acquired by the camera through an optical system, the optical system including a plurality of optical surfaces and an optical combiner, wherein each of the plurality of optical surfaces is defined by a difference of optical index on opposing sides of the surface. The method further comprises determining at least one calibration parameter for the optical system by mapping a plurality of rays from each of the plurality of camera pixels to each of the plurality of target points via raytracing through the optical system, wherein the raytracing is based on the index differences of the plurality of optical surfaces, the shapes of the plurality of optical surfaces, and the positions of the plurality of optical surfaces relative to the one or more cameras.

In another example, this disclosure is directed to a system comprising a device comprising at least one image capture device, and a processor executing a calibration engine. The calibration engine is configured to determine a plurality of correspondences between a plurality of target points of a target and a plurality of camera pixels of one or more cameras based on one or more images of the target acquired by the camera through an optical system, the optical system including a plurality of optical surfaces and an optical combiner, wherein each of the plurality of optical surfaces is defined by a difference of optical index on opposing sides of the surface. The calibration engine is further configured to determine at least one calibration parameter for the optical system by mapping a plurality of rays from each of the plurality of camera pixels to each of the plurality of target points via raytracing through the optical system, wherein the raytracing is based on the index differences of the plurality of optical surfaces, the shapes of the plurality of optical surfaces, and the positions of the plurality of optical surfaces relative to the one or more cameras.

In a further example, this disclosure is directed to an augmented reality (AR) system comprising a head mounted display (HMD) comprising at least one image capture device, and a processor executing a calibration engine. The calibration engine is configured to determine a plurality of correspondences between a plurality of target points of a target and a plurality of camera pixels of one or more cameras based on one or more images of the target acquired by the camera through an optical system, the optical system including a plurality of optical surfaces and an optical combiner, wherein each of the plurality of optical surfaces is defined by a difference of optical index on opposing sides of the surface. The calibration engine is further configured to determine at least one calibration parameter for the optical system by mapping a plurality of rays from each of the plurality of camera pixels to each of the plurality of target points via raytracing through the optical system, wherein the raytracing is based on the index differences of the plurality of optical surfaces, the shapes of the plurality of optical surfaces, and the positions of the plurality of optical surfaces relative to the one or more cameras.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

The present disclosure describes calibration techniques for optical systems of head mounted display (HMD). As described herein, the techniques may be particularly useful for calibrating optical systems for augmented reality (AR) HMDs having reflective combiners, and display subsystems having one or more off-axis reflective combiners for see-through optics. In some examples, the combiner is partially transparent and partially reflective in the visible wavelength spectrum.

In general, automatic and efficient techniques for calibrating reflector-based HMDs for augmented reality are described. In some examples, the techniques of this disclosure utilize raycast calibration, which is described herein as a technique to reconstruct a physics-based model of the HMD. In some examples, the calibration techniques generate an optical system model whose aperture is a pupil position, and thus can generate new world-to-display projections by translating the aperture in the model. Because the model captures complex distortion yet has a low number of parameters as compared with other models, it can be calibrated with small data acquisition but generalizes well within the eyebox. The raycast-based calibration techniques described herein also provide a natural way to decompose the full system calibration into multiple substeps and combining them afterwards. The decomposition of calibration allows the calibration process to compute a solution for a sub-problem in each step, thus requiring less data acquisition, is more robust to hardware failure, and making the calibration workflow more modular and parallizable.

In this way, techniques of this disclosure include raycast calibration to reconstruct a physics-based model of the HMD, e.g. determining the pose (rotation and translation) and optical parameters (sag, thickness, refractive index, etc.) of one or more components of the HMD, including the combiner. In some examples, raycasting maps calibration camera pixels to target points via raytracing from camera pixels to target points. Camera-to-target correspondences measured from a physical build of the HMD configured with eyeball calibration cameras estimate certain system optical parameters and may be utilized by raycasting to map camera pixels to target points. In some examples described herein-raycasting may trace both visible and invisible camera pixels (e.g. pixels for which rays cannot intersect with an optical surface on the light path from pixel to any point on the target).

The disclosed techniques may be applied to calibrate multiple different components of the HMD, including image capture devices such as eye-tracking cameras and inside-out cameras, displays, illuminators, sensors, and the like.

Figure 1:
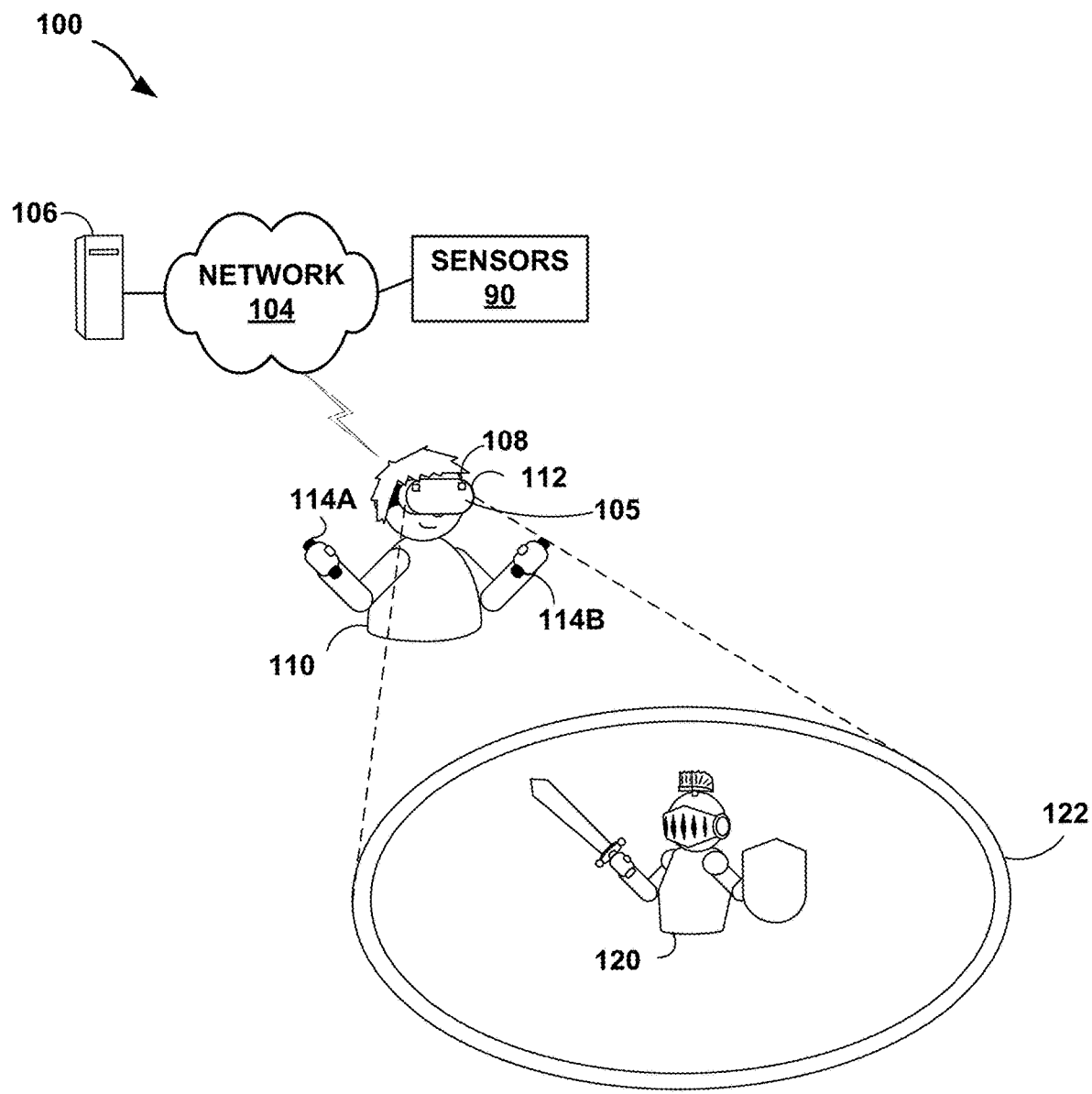
FIG. 1 is an illustration depicting an example artificial reality system that includes a head-mount display (HMD) having one or more components calibrated using raycast-based calibration, in accordance with the techniques described in this disclosure.

FIG. 1 is an illustration depicting an example artificial reality system includes a combiner 105, in accordance with the techniques described in this disclosure. In the example of FIG. 1, artificial reality system 100 includes HMD 112, one or more controllers 114A and 114B (collectively, "controller(s) 114"), and may in some examples include one or more external sensors 90 and/or a console 106.

HMD 112 is typically worn by user 110 and includes an electronic display and optical assembly for presenting artificial reality content 122 to user 110. In addition, HMD 112 includes one or more sensors (e.g., accelerometers) for tracking motion of the HMD 112 and may include one or more image capture devices 108 (e.g., cameras, line scanners) for capturing image data of the surrounding physical environment. Although illustrated as a head-mounted display, AR system 100 may alternatively, or additionally, include glasses or other display devices for presenting artificial reality content 122 to user 110.

Each controller(s) 114 is an input device that user 110 may use to provide input to console 106, HMD 112, or another component of artificial reality system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of the artificial reality content 122 presented to user 110 by artificial reality system 100.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile artificial reality system, and artificial reality system 100 may omit console 106.

In general, artificial reality system 100 renders artificial reality content 122 for display to user 110 at HMD 112. In the example of FIG. 1, a user 110 views the artificial reality content 122 constructed and rendered by an artificial reality application executing on HMD 112 and/or console 106. In some examples, the artificial reality content 122 may be fully artificial, i.e., images not related to the environment in which user 110 is located. In some examples, artificial reality content 122 may comprise a mixture of real-world imagery (e.g., a hand of user 110, controller(s) 114, other environmental objects near user 110) and virtual objects 120 to produce mixed reality and/or augmented reality. In some examples, virtual content items may be mapped (e.g., pinned, locked, placed) to a particular position within artificial reality content 122, e.g., relative to real-world imagery. A position for a virtual content item may be fixed, as relative to one of a wall or the earth, for instance. A position for a virtual content item may be variable, as relative to controller(s) 114 or a user, for instance. In some examples, the particular position of a virtual content item within artificial reality content 122 is associated with a position within the real-world, physical environment (e.g., on a surface of a physical object).

During operation, the artificial reality application constructs artificial reality content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 100 may trigger generation and rendering of virtual content items based on a current field of view of user 110, as may be determined by real-time gaze tracking of the user, or other conditions. More specifically, image capture devices 108 of HMD 112 capture image data representative of objects in the real-world, physical environment that are within a field of view 130 of image capture devices 108, as illustrated in FIG. 2. Field of view 130 typically corresponds with the viewing perspective of HMD 112. In some examples, the artificial reality application presents artificial reality content 122 comprising mixed reality and/or augmented reality. The artificial reality application may render images of real-world objects, such as the portions of a peripheral device, the hand, and/or the arm of the user 110, that are within field of view 130 along with virtual objects 120, such as within artificial reality content 122. In other examples, the artificial reality application may render virtual representations of the portions of a peripheral device, the hand, and/or the arm of the user 110 that are within field of view 130 (e.g., render real-world objects as virtual objects 120) within artificial reality content 122. In either example, user 110 is able to view the portions of their hand, arm, a peripheral device and/or any other real-world objects that are within field of view 130 within artificial reality content 122. In other examples, the artificial reality application may not render representations of the hand or arm of user 110.

Figure 2A:
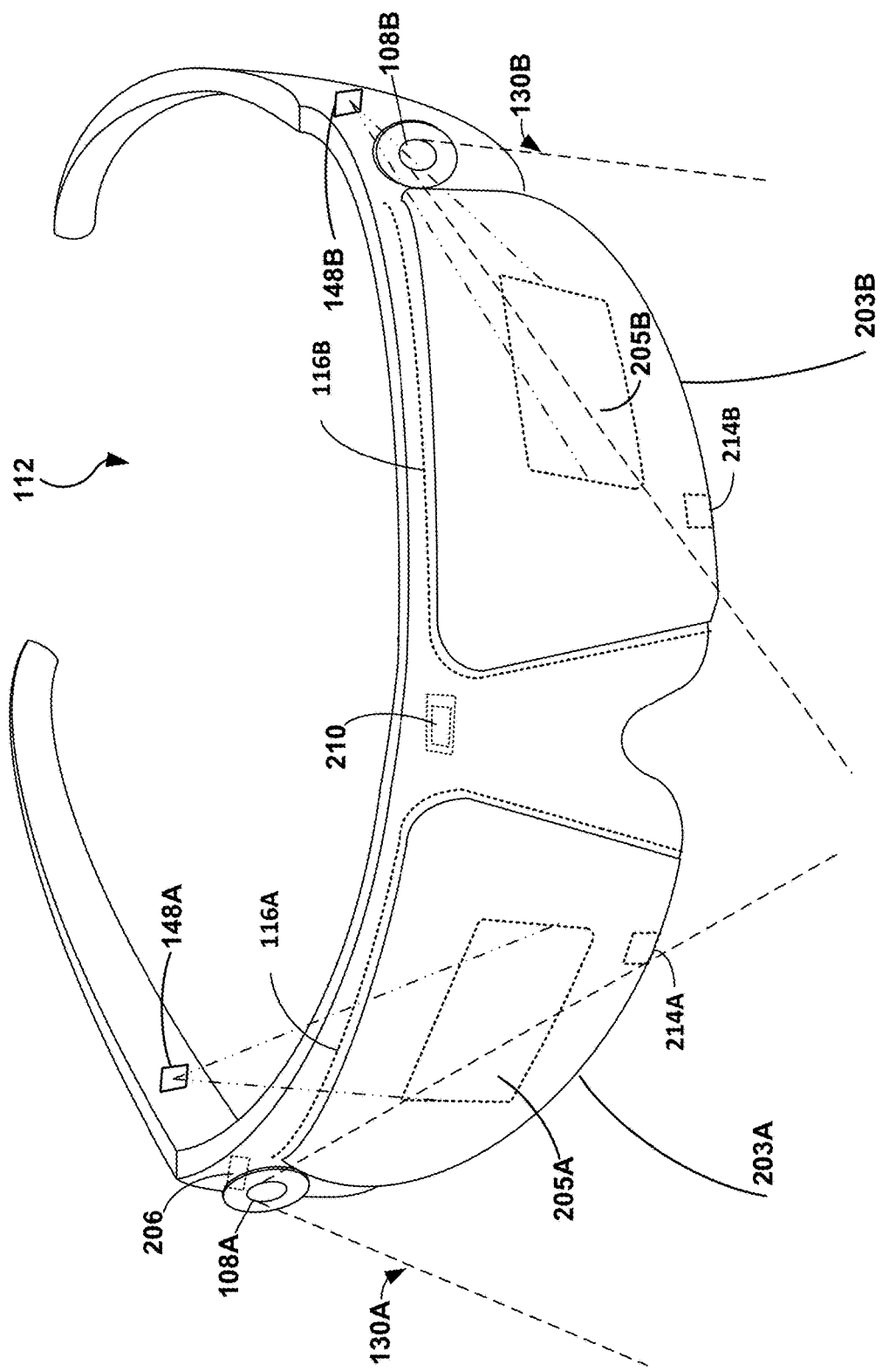
FIG. 2A is an illustration depicting an example HMD that includes a combiner, in accordance with techniques described in this disclosure.

In some embodiments, the artificial reality system 100 may be configured to render virtual content overlaid with real-world objects in a scene that the user can directly view through an optical combiner 105 included in the HMD 112. In accordance with examples disclosed herein, combiner 105 may be flat or curved, and positioned at least partially within the field of view of the user. In some examples, the combiner 105 fills the entire field of view of the user or the entire field of view 130 of the image capture devices 108 (e.g. as illustrated in FIG. 2A). The HMD 112 can include a display viewable to the user via the combiner 105 and configured to overlay a virtual image of the display with real-world objects in a scene within the user's field of view. For example, the combiner 105 may reflect light from the display such that at least a portion of the light is directed towards the eyes of user 110, thereby overlaying the virtual image of the display provided by combiner 105 with the real-world scene within field of view of user 110.

In general, HMD 112 may be configured to operate according to parameters determined according to the raycast-based calibration techniques described herein. For example, as further explained herein, one more calibration parameters for the optical components of HMD 112 may be configured according to a physics-based model computed during a 'ray casting' calibration process by mapping camera pixels to target points by modeling optical rays backward from the camera to the target.

Figure 2B:
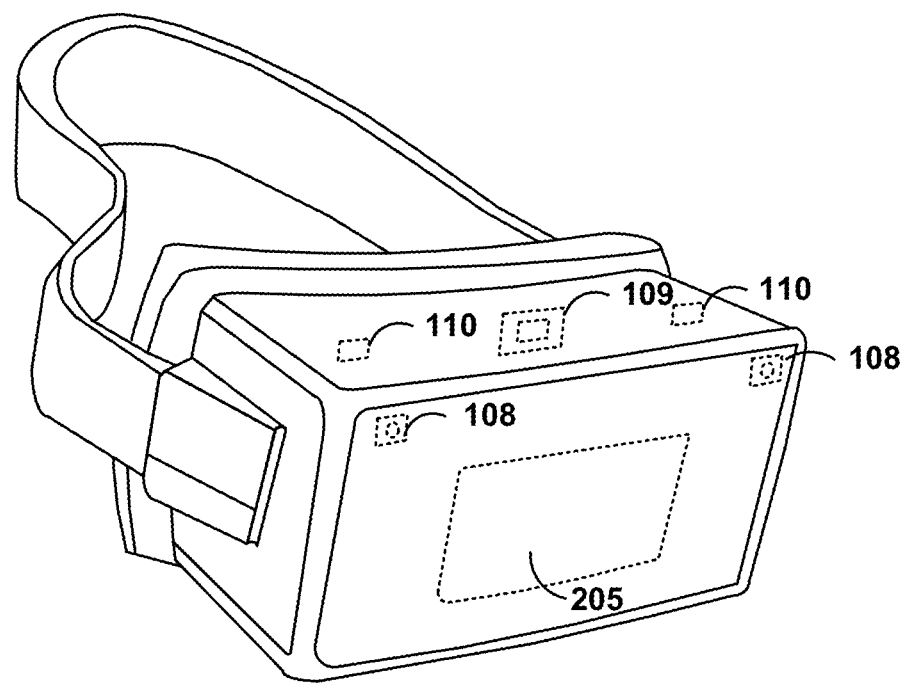
FIG. 2B is an illustration depicting another example HMD that includes a combiner, in accordance with techniques described in this disclosure.

FIGS. 2A-2B are illustrations depicting example HMDs 112 having different form factors. In general, each of HMDs 112 of FIGS. 2A-2B may operate as a stand-alone, mobile artificial realty system, or may be part of an artificial reality system that includes a peripheral device and/or a console. In any case, the artificial reality system uses information captured from a real-world, 3D physical environment to render artificial reality content for display to a user of the HMD. In the case of a stand-alone, mobile artificial reality system (described in more detail with respect to FIG. 3), each of HMDs 112 constructs and renders the artificial reality content itself.

In the case of an artificial reality system that includes a peripheral device and/or a console (described in more detail with respect to FIG. 4), the peripheral device and/or the console may perform at least some of the construction and rendering of the artificial reality content for display by the HMD. As one example, an HMD may be in communication with, e.g., tethered to or in wireless communication with, a console. The console may be a single computing device, such as a gaming console, workstation, a desktop computer, or a laptop, or distributed across a plurality of computing devices, such as a distributed computing network, a data center, or a cloud computing system. As another example, an HMD may be associated with a peripheral device that coexists with the HMD and, in some examples, operates as an auxiliary input/output device for the HMD in a virtual environment. The peripheral device may operate as an artificial reality co-processing device to which some of the functions of the HMD are offloaded. In some examples, the peripheral device may be a smartphone, tablet, or other hand-held device.

In general, the example HMDs 112 of FIGS. 2A, 2B may be configured to operate according to parameters determined according to the raycast-based calibration techniques described herein. For example, as further explained herein, one more calibration parameters for the optical components of HMD 112 may be configured according to a physics-based model computed during a 'ray casting' calibration process by mapping camera pixels to target points by modeling optical rays backward from the camera to the target.

FIG. 2A, for example, is an illustration depicting an example HMD 112 that includes a combiner 205, in accordance with techniques described in this disclosure. HMD 112 of FIG. 2A may be an example of HMD 112 of FIG. 1. As shown in FIG. 2A, HMD 112 may take the form of glasses. HMD 112 may be part of an artificial reality system, such as artificial reality system 100 of FIG. 1, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2A includes one or more windows 203A and 203B (collectively, "windows 203") and one or more combiners 205A and 205B (collectively, "combiners 205") configured to reflect light output by one or more projectors or displays 148A and 148B. In some examples, the orientation and position of the windows 203 relative to the front frame of the HMD 112 and other components of the HMD 112 are determined via calibration. In some examples, the known (e.g. calibrated) orientation and position of windows 203 relative to the front frame and other components of HMD 112 is used as a frame of reference, also referred to as a local origin, when tracking the position and orientation of HMD 112 for rendering artificial reality content according to a current viewing perspective of HMD 112 and the user. In some examples, the projectors or displays 148 can provide a stereoscopic display for providing separate images to each eye of the user.

In the example shown, combiners 205 cover a portion of the windows 203, subtending a portion of the field of view that is viewable by a user 110 through the windows 203. In other examples, combiners 205 can cover other portions of the windows 203, or the entire area of windows 203.

As further shown in FIG. 2A, in this example HMD 112 further includes one or more electronic displays 148 configured to present artificial reality content to the user. Electronic displays 148 may be any suitable display technology, such as liquid crystal displays (LCD), quantum dot display, dot matrix displays, light emitting diode (LED) displays, organic light-emitting diode (OLED) displays, waveguide displays, cathode ray tube (CRT) displays, e-ink, LCoS projectors, or monochrome, color, or any other type of display capable of generating visual output. In some examples, electronic displays 148 are stereoscopic displays for providing separate images to each eye of the user. In some examples, the known orientation and position of displays 148 relative to the front frame of HMD 112 is used as a frame of reference, also referred to as a local origin, when tracking the position and orientation of HMD 112 for rendering artificial reality content according to a current perspective of HMD 112 and the user.

As further shown in FIG. 2A, in this example HMD 112 further includes one or more motion sensors 206, such as one or more accelerometers (also referred to as inertial measurement units or "IMUs") that output data indicative of current acceleration of HMD 112, global positioning system (GPS) sensors that output data indicative of a location of HMD 112, radar, or sonar that output data indicative of distances of HMD 112 from various objects, or other sensors that provide indications of a location or orientation of HMD 112 or other objects within a physical environment.

Moreover, HMD 112 may include one or more integrated image capture devices such as video cameras, laser scanners, Doppler® radar scanners, depth scanners, or the like. For example, as illustrated in FIG. 2A, HMD 112 includes inside-out cameras 108A and 108B (collectively, "inside-out cameras 108") configured to capture image data representative of the physical environment surrounding the user. HMD 112 also includes eye-tracking cameras 214A and 214B (collectively "eye-tracking cameras 214") configured to capture image data representative of a direction of the user's gaze. HMD 112 includes illuminators 116A and 116B (collectively "illuminators 116") positioned around or proximate to the eyepieces of the rigid front frame of the HMD 112. Illuminators 116 may comprise an array of light-emitting diodes (LEDs) or other sources of light, e.g., invisible light such as infrared light, used to illuminate the user's eyes for purposes of gaze-tracking by eye-tracking cameras 214. In other examples, HMD 112 may include additional image capture devices, including one or more glabella cameras configured to capture image data used to determine a distance between the front frame of HMD 112 and the user's forehead, one or more mouth cameras configured to capture image data of the user's mouth used for speech recognition, and/or one or more lower temporal cameras configured to capture image data used to determine a distance between arms of HMD 112 and side areas of the user's face.

As shown in FIG. 2A, HMD 112 includes an internal control unit 120, which may include an internal power source, e.g., a rechargeable battery, and one or more printed-circuit boards having one or more processors, memory, and hardware to provide an operating environment for executing programmable operations to process sensed data and present artificial reality content on displays 148. Internal control unit 210 of HMD 112 is described in more detail with respect to FIGS. 3 and 4.

FIG. 2B is an illustration depicting another example HMD 112, in accordance with techniques described in this disclosure. In particular, HMD 112 of FIG. 2B may be part of an augmented artificial reality system, such as artificial reality system 100 of FIG. 1, or may operate as a stand-alone, mobile artificial realty system configured to implement the techniques described herein.

In this example, HMD 112 includes a front rigid body and a band to secure HMD 112 to a user. In addition, the example HMD 112 of FIG. 2B includes a simultaneous localization and mapping (SLAM) subsystem 108 with passive cameras and an inertial measurement unit (IMU). HMD 112 further includes display subsystem 109 having a reflective combiner 205 and mechanical varifocal for refocusing, and a glint-based eye-tracking system 110 with LED rings and eye-tracking cameras. In this example, display subsystem 109 including reflective combiner 205 may be configured to present augmented reality content to the user and also serve as the windows of the HMD by which the user views the physical environment.

In general, calibration parameters for HMD 112, such as the orientation and position of combiners 205 for display subsystem 109 relative to the front frame of the HMD 112 and other components of the HMD 112 are determined via calibration in accordance with the techniques described herein. That is, HMD 112 may be configured to operate according to parameters configured according to the raycast-based calibration techniques described herein. In some examples, the calibrated orientation and position of combiners 205 for display subsystem 109 relative to the front rigid body and other components of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles. In some examples, the combiners 205 can be flat, e.g. having opposing planar and parallel surfaces separated by a nominal thickness. In other examples, combiners 205 can have a shape, e.g. having opposing surfaces having curvature and separated by a nominal thickness or by a thickness that varies with position on the surfaces of the combiners. In such examples, curved combiners 205 may have optical power, or focusing power, at least in reflection, and in some examples curved combiners can have optical power in both reflection and transmission.

Figure 3:
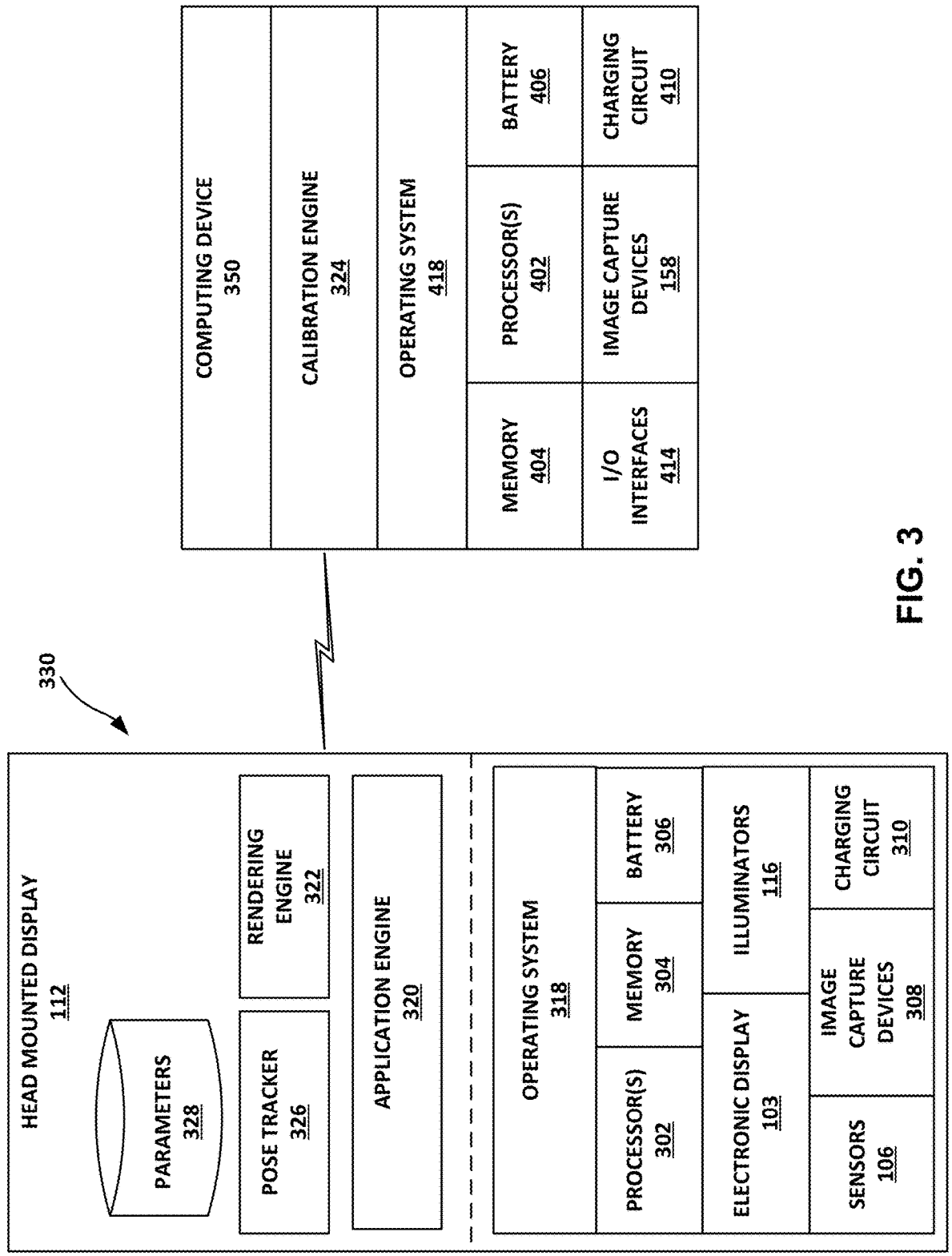
FIG. 3 is a block diagram illustrating an example implementation of a HMD operating as a stand-alone, mobile artificial reality system and computing device in accordance with the techniques of the disclosure.

FIG. 3 is a block diagram illustrating an example implementation of HMD 112 of FIGS. 1-2B operating as a stand-alone, mobile artificial reality system and computing device 350, in accordance with the techniques of the disclosure. In this example, HMD 112 includes one or more processors 302 and memory 304 that, in some examples, provide a computer platform for executing an operating system 318, which may be an embedded, real-time multi-tasking operating system, for instance, or another type of operating system. In turn, operating system 318 provides a multitasking operating environment for executing one or more software components 330. In some examples, processors 302 and memory 304 may be separate, discrete components. In other examples, memory 304 may be on-chip memory collocated with processors 302 within a single integrated circuit. Processors 302 may comprise any one or more of a multi-core processor, a controller, a digital signal processor (DSP), an application specific integrated circuit (ASIC), a field-programmable gate array (FPGA), or equivalent discrete or integrated logic circuitry. Memory 304 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

As illustrated in FIG. 3, processors 302 are coupled to electronic display 103, sensors 106, image capture devices 308 (e.g., image capture devices 108 and/or eye-tracking cameras 214), and illuminators 116. HMD 112 further includes a rechargeable battery 306 coupled to a charging circuit 310. Charging circuit 310 is configured to receive a charging current via either a wired or wireless (i.e., inductive) connection and use the received current to recharge battery 306.

Software components 330 operate to provide an overall artificial reality application. In this example, software applications 330 include application engine 320, rendering engine 322, and pose tracker 326. In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on HMD 112.

Application engine 320 and rendering engine 322 construct the artificial content for presentation to a user of HMD 112 in accordance with current pose information for a frame of reference, typically a viewing perspective of HMD 112, as determined by pose tracker 326. Based on the current viewing perspective, rendering engine 322 constructs the 3D, artificial reality content which may be overlaid, at least in part, upon the real-world 3D environment of the user. During this process, pose tracker 326 operates on sensed data, such as movement information and user commands, and, in some examples, data from any external sensors, such as external cameras, to capture 3D information within the real world environment, such as motion and/or feature tracking information with respect to the user of HMD 112. Based on the sensed data, pose tracker 326 determines a current pose for the frame of reference of HMD 112 and, in accordance with the current pose, rendering engine 322 constructs the artificial reality content for presentation to the user on electronic display 103.

In one or more aspects, parameters 328 of the components of HMD 112 (e.g., image capture devices 308, electronic display 103, sensors 106, and illuminators 116) may be stored in a database, a map, a search tree, or any other data structure. For example, parameters 328 may include camera parameters for each of image capture devices 308 of HMD 112. The camera parameters may be estimated based on a correspondence between 3D real-world coordinates and 2D image coordinates that is determined using multiple images of a calibration pattern, e.g., a checkerboard pattern. Camera parameters may include intrinsic and extrinsic parameters, and in some cases lens distortion parameters. The 3D real-world coordinates are transformed to 3D camera coordinates using extrinsic parameters and the 3D camera coordinates are mapped into the 2D image coordinates using the intrinsic parameters. Example extrinsic parameters of a camera include the rotation and translation used to transform from the 3D real-world coordinates to the 3D camera coordinates. Example intrinsic parameters of the camera may include the focal length (i.e., how strongly the camera converges or diverges light), the principal point (i.e., the position of the optical center), and the skew coefficient (i.e., the distortion of the image axes from perpendicular) used to map the 3D camera coordinates into the 2D image coordinates. In some examples, the parameters may also include lens distortion parameters (i.e., radial distortion at the edges of the lens and tangential distortion between the lens and the camera sensor image plane).

As illustrated in FIG. 3, computing device 350 includes one or more processors 402 and memory 404 that, in some examples, provide a computer platform for executing an operating system 418, which may be an embedded, real-time multitasking operating system, for instance, or another type of operating system. In turn, operating system 418 provides a multitasking operating environment for executing one or more software components 430. In some examples, processors 402 and memory 404 may be separate, discrete components. In other examples, memory 404 may be on-chip memory collocated with processors 402 within a single integrated circuit. Processors 402 may comprise any one or more of a multi-core processor, a controller, a DSP, an ASIC, a FPGA, or equivalent discrete or integrated logic circuitry. Memory 404 may comprise any form of memory for storing data and executable software instructions, such as RAM, ROM, PROM, EPROM, EEPROM, and flash memory.

Computing device 350 may be in communication with HMD 112 and, in some examples, operate as an auxiliary input/output device for HMD 112 in the virtual environment. For example, as illustrated in FIG. 3, processors 402 are coupled to one or more I/O interfaces 414 for communicating with external devices, such as a keyboard, game controllers, display devices, image capture devices, HMDs, and the like. Moreover, the one or more I/O interfaces 414 may include one or more wired or wireless network interface controllers (NICs) for communicating with a network. Processors 402 are also coupled to image capture devices 158. computing device 350 further includes a rechargeable battery 406 coupled to a charging circuit 410, which is configured to receive a charging current via either a wired or wireless (i.e., inductive) connection and use the received current to recharge battery 406. In one or more aspects, computing device 350 may be a smartphone, tablet, or other hand-held device.

In the example of FIG. 3, computing device 350 includes calibration engine 324. In accordance with the disclosed techniques, calibration engine 324 is configured to perform calibration of one or more components of HMD 112 based on one or more images of a calibration target captured by image capture devices 308. For example, calibration engine 324 may be configured to perform calibration of one or more of image capture devices 308 (e.g., inside-out cameras 108 and/or eye-tracking cameras 214), electronic display 103, sensors 106, and/or illuminators 116. Calibration engine 324 performs the calibration by determining intrinsic and/or extrinsic parameters 328 of the respective components, and configuring the respective components to operate according to the determined parameters. In the case of calibrating one of image capture devices 308, calibration engine 324 performs the calibration by determining intrinsic and/or extrinsic parameters 328 of the one of image capture devices 308 based on captured images of a calibration target and a spatial relationship between a position of HMD 112 and a position of the calibration target. Calibration engine 324 may be configured to update or adjust the parameters to correct for changes from initial calibration settings of the one of image capture device 308. Calibration engine 324 then configures the one of image capture devices 308 to operate according to the determined parameters.

Upon calibration of the one or more image capture devices 308, calibration engine 326 stores the updated intrinsic and/or extrinsic parameters 328 of the one of image capture devices 308. Calibration engine 324 may then further calibrate electronic display 103, one of illuminators 116, or one of sensors 106 with respect to the one of image capture devices 308. For example, calibration engine 324 may calibrate electronic display 103, one of illuminators 116, or one of sensors 106 based on images of a calibration target captured by the previously calibrated one of image capture devices 308.

As further described below, in some examples, calibration engine 324 applies raycast-based calibration of one or more components of a head mounted display (HMD) included in an artificial reality system, such as an augmented reality (AR) system having one or more off-axis reflective combiners. For example, calibration engine 324 may dynamically compute a physics-based model of the HMD that maps camera pixels to target points, where the calibration engine models the projection of light rays backward from the camera to the target, with such techniques being referred to herein as 'ray casting' calibration techniques.

Figure 4:
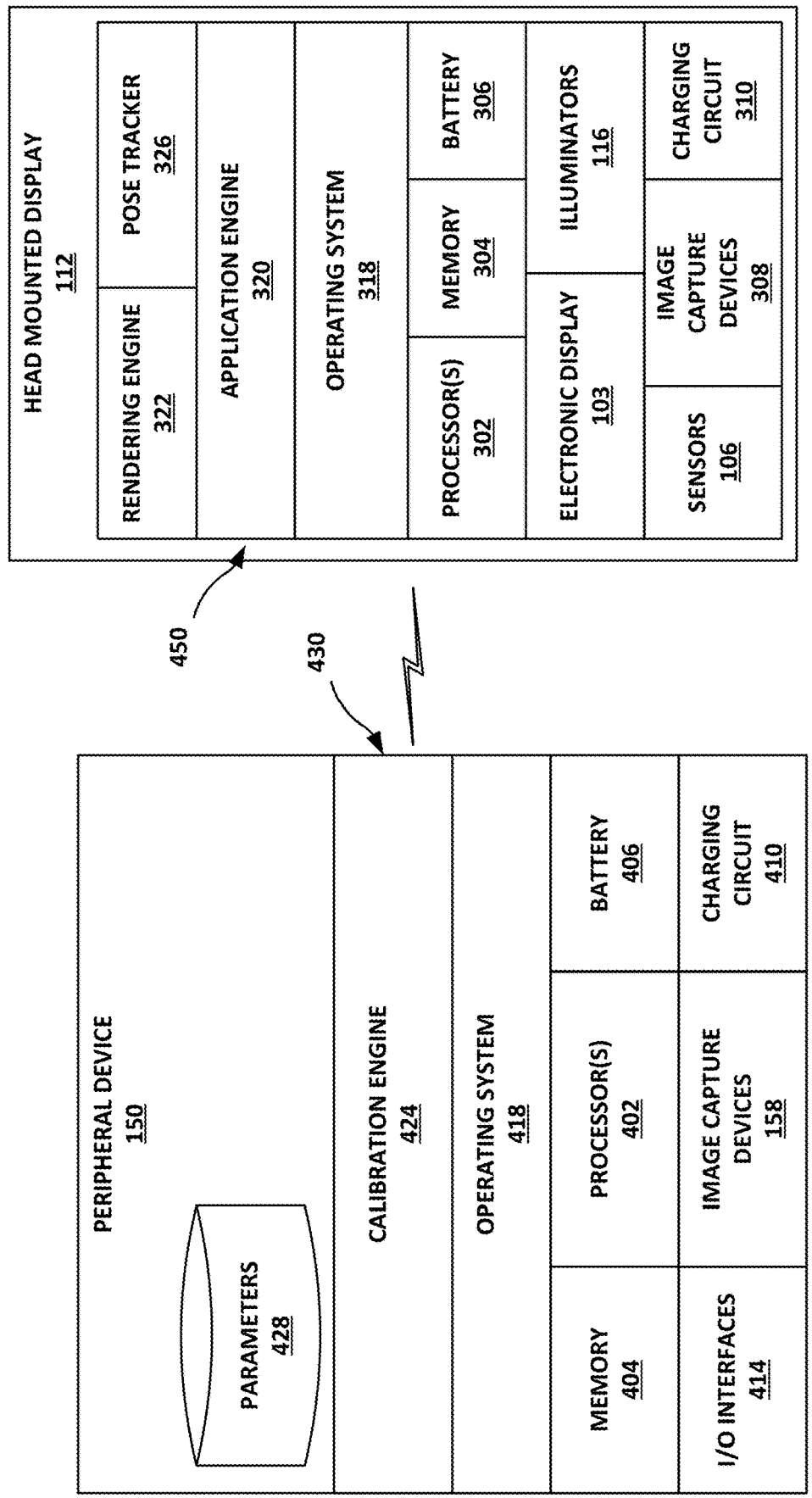
FIG. 4 is a block diagram illustrating an example implementation of a HMD and a peripheral device operating as an artificial reality system in accordance with the techniques of the disclosure.

FIG. 4 is a block diagram illustrating an example implementation of HMD 112 and a peripheral device 150 operating as an artificial reality system in accordance with the techniques of the disclosure. Peripheral device 150 coexists with HMD 112 and, in some examples, operates as an auxiliary input/output device for HMD 112 in a virtual environment. Peripheral device 150 may operate as an artificial reality co-processing device to which some of the functions of HMD 112 are offloaded. In some examples, peripheral device 150 may be a smartphone, tablet, or other hand-held device. In this example, similar to FIG. 3, HMD 112 includes one or more processors 302 and memory 304 that, in some examples, provide a computer platform for executing an operating system 318, which may be an embedded, real-time multitasking operating system, for instance, or another type of operating system. In turn, operating system 318 provides a multitasking operating environment for executing one or more software components 450. Moreover, processors 302 are coupled to electronic display 103, sensors 106, image capture devices 308 (e.g., inside-out cameras 108 and/or eye-tracking cameras 214), and illuminators 116. HMD 112 further includes a rechargeable battery 306 coupled to a charging circuit 310, which is configured to receive a charging current via either a wired or wireless (i.e., inductive) connection and use the received current to recharge battery 306. In the example of FIG. 4, software components 450 operate to provide an overall artificial reality application. In this example, software applications 450 include application engine 320, rendering engine 322, and pose tracker 326. In various examples, software components 450 operate similar to the counterpart components 330 of FIG. 3.

As illustrated in FIG. 4, peripheral device 150 includes one or more processors 402 and memory 404 that, in some examples, provide a computer platform for executing an operating system 418, which may be an embedded, real-time multitasking operating system, for instance, or another type of operating system. In turn, operating system 418 provides a multitasking operating environment for executing one or more software components 430. In some examples, processors 402 and memory 404 may be separate, discrete components. In other examples, memory 404 may be on-chip memory collocated with processors 402 within a single integrated circuit. Processors 402 may comprise any one or more of a multi-core processor, a controller, a DSP, an ASIC, a FPGA, or equivalent discrete or integrated logic circuitry. Memory 404 may comprise any form of memory for storing data and executable software instructions, such as RAM, ROM, PROM, EPROM, EEPROM, and flash memory.

Peripheral device 150 may include one or more motion sensors (e.g., accelerometers, IMUs, GPS sensors, radar, sonar, and the like) that provide indications of a location or orientation of peripheral device 150 or other objects within a physical environment. In addition, peripheral device 150 may include a presence-sensitive surface, such as a surface that uses capacitive, conductive, resistive, acoustic, or other technology to detect touch and/or hover input. In some examples, the surface of peripheral device 150 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). Peripheral device 150 may also include one or more integrated image capture devices configured to capture image data representative of the physical environment. Peripheral device 150 includes image capture devices 158.

Peripheral device 150 may coexist with HMD 112 and, in some examples, operate as an auxiliary input/output device for HMD 112 in the virtual environment. For example, as illustrated in FIG. 4, processors 402 are coupled to one or more I/O interfaces 414 for communicating with external devices, such as a keyboard, game controllers, display devices, image capture devices, HMDs, and the like. Moreover, the one or more I/O interfaces 414 may include one or more wired or wireless network interface controllers (NICs) for communicating with a network. Processors 402 are also coupled to image capture devices 158. Peripheral device 150 further includes a rechargeable battery 406 coupled to a charging circuit 410, which is configured to receive a charging current via either a wired or wireless (i.e., inductive) connection and use the received current to recharge battery 406. In one or more aspects, peripheral device 150 may be a smartphone, tablet, or other hand-held device.

Peripheral device 150 may operate as an artificial reality co-processing device to which some of the functions of HMD 112 are offloaded. In the example of FIG. 4, software components 430 of peripheral device 150 include calibration engine 424. Calibration engine 424 may operate similar to the counterpart component of calibration engine 324 of HMD 112 from FIG. 3 to perform calibration of one or more components of HMD 112. For example, calibration engine 424 of peripheral device 150 may be configured to perform calibration of one or more of image capture devices 308 (e.g., inside-out cameras 108 and/or eye-tracking cameras 214), electronic display 103, sensors 106, and/or illuminators 116 of HMD 112.

Similar to the examples described with respect to FIG. 3, calibration engine 424 is configured to perform calibration of one or more components of HMD 112 based on one or more images of a calibration target captured by image capture devices 308 of HMD 112 and/or image capture devices 158 of peripheral device 150.

In the case of calibrating one of image capture devices 308 of HMD 112, calibration engine 424 performs the calibration by determining intrinsic and/or extrinsic parameters of the one of image capture devices 308 based on captured images of a calibration target and a spatial relationship between a position of HMD 112 and a position of the calibration target. In the case of calibrating electronic display 103 of HMD 112, calibration engine 424 performs the calibration by determining intrinsic and/or extrinsic parameters of electronic display 103 based on images produced on display 103 that are captured by image capture devices 158 of peripheral device 150 and a spatial relationship between a position of HMD 112 and a position of image capture devices 158. Calibration engine 424 may be configured to update or adjust the parameters to correct for changes from initial calibration settings of the one of image capture device 308 and/or electronic display 103. Calibration engine 424 of peripheral device 150 then configures the one of image capture devices 308 and/or electronic display 103 of HMD 112 to operate according to the determined parameters.

In order to determine the camera parameters, calibration engine 424 may determine the spatial relationship between the position of HMD 112, the position of image captures devices 158, and/or the position of the calibration targets.

Upon calibration of the one of image capture devices 308 and/or electronic display 103 of HMD 112, calibration engine 426 of peripheral device 150 stores the updated intrinsic and/or extrinsic parameters 428 of the one of image capture devices 308 and/or electronic display 103. Calibration engine 424 may then further calibrate one of illuminators 116 and/or one of sensors 106 based on images of a calibration target captured by the previously calibrated one of image capture devices 308.

As further described below, in some examples, calibration engine 424 applies raycast-based calibration of one or more components of a head mounted display (HMD) included in an artificial reality system, such as an augmented reality (AR) system having one or more off-axis reflective combiners. For example, calibration engine 424 may dynamically compute a physics-based model of the HMD that maps camera pixels to target points, where the calibration engine models the projection of light rays backward from the camera to the target, with such techniques being referred to herein as 'ray casting' calibration techniques.

Figure 5:
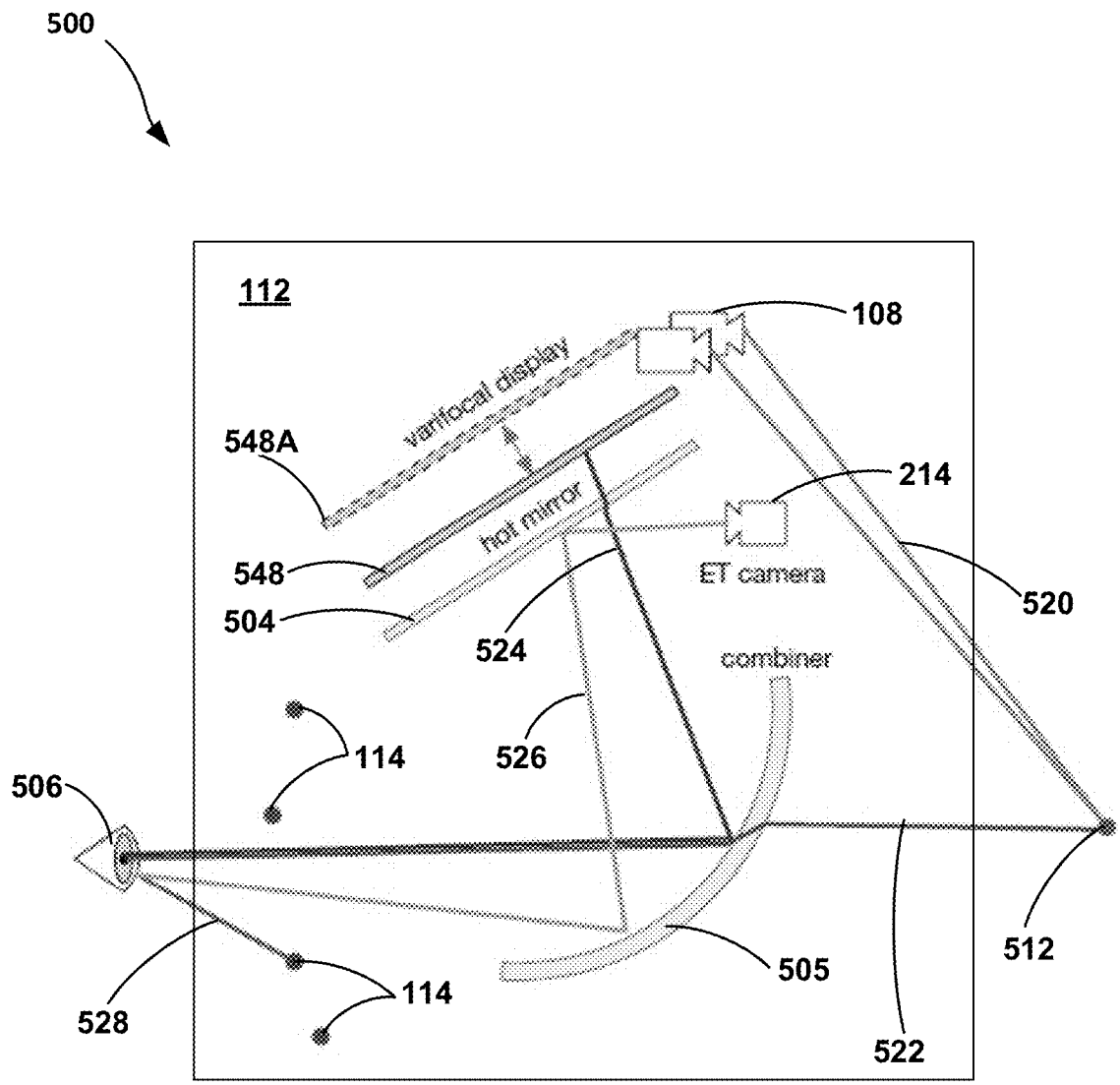
FIG. 5 is a schematic illustration of an AR system depicting raycast-based calibration of optical components of an example HMD, in accordance with techniques described in this disclosure.

FIG. 5 is a schematic illustration of an AR system 500 depicting raycast-based calibration of optical components of an example HMD 112, in accordance with techniques described in this disclosure. In the example shown, the AR system 500 includes eyeball cameras 506, HMD 112, and real-world 3D position 512. In the example shown, HMD 112 includes a varifocal display 548, image capture devices 108, illuminators 116, eye-tracking cameras 214, hot mirror 504, and optical combiner 505.

In the example shown, the combiner 505 is a partially transparent, partially reflective optical element that can both redirect light from the display and transmit light from real-world 3D positions. In the example shown, the combiner 505 has curved surfaces, and therefore optical power, to magnify the varifocal display 548 to the user. In other embodiments, the combiner 505 is "flat," for example, having parallel surfaces separated by a nominal thickness.

In the example shown, the entrance pupils of the eyeball cameras 506 are placed at the positions of the entrance pupil of the eyes of a user of the HMD 112. The eyeball cameras 506 can be any appropriate image capture technology, and preferably captures digital color images. The eyeball cameras 506 in the example shown are configured to capture image data of varifocal display 548 and real-world 3D positions such as the real-world 3D position 518.

In the example shown, the varifocal display can be any type of appropriate display technology as discussed above with respect to FIG. 2A. In some examples, varifocal display 548 may include optical elements having tunable or switchable optical power, and is configured to vary the depth at which varifocal display 548 appears in focus to the user (or the eyeball cameras 506) of the HMD 112, for example, at the apparent depth of varifocal display 548A.

In the example shown, the hot mirror 504 is configured to reflect light from the illuminators 116 to the eye-tracking cameras 214. In some examples, hot mirror 504 may be configured to reflect invisible light, such as infrared light from illuminators 116 used to illuminate the user's eyes for gaze-tracking, while transmitting visible light.

In the example AR system 500 shown, the optical system is specified by placement of all the components in the HMD 112 as well as intrinsic parameters of individual component, for example, the image capture devices 108, eye-tracking cameras 214, the eyeball cameras 506, etc. In some examples, the component placement can be specified by the pose (e.g. rotation and translation) of each component to a global coordinate frame, such as the local coordinate frame of the image capture devices 108 local frame. In some examples, the intrinsic parameters can be focal length and distortion parameters of cameras 108, 214, 506, or shape, thickness and refractive index of the combiner 505.

If the placement and parameters of the all the components of the AR system 500 are known accurately, real-world 3D positions can be projected onto the varifocal display 548 from the perspective of the user (e.g. the eyeball cameras 506) via raytracing. However, HMD 112 mounting errors and component form errors cause misalignment and necessitate calibration to measure the actual real-world 3D positions projection in order to calculate the accurate actual placement and parameters of all the components of the AR system 500. In some examples, calculation of the placement and parameters of the components of the AR system 500 is accomplished via raytracing, for example, by adjusting the placement and parameters of the components of the AR system 500 to arrive at the actual real-world 3D positions projections measured during calibration via raytracing. In some examples, calculation of the placement and parameters of the components of the AR system 500 may be accomplished via raycast calibration in which a model of the AR system 500 is generated from a combination of measured projections of real-world 3D positions from calibration and raytracing. Raycast calibration may require a relatively low number of parameters necessitating a relatively small calibration data set.

In some examples, calibration of the AR system 500 may be divided into a number of substeps, with each substep involving some of the components of the AR system 500, and combining the results of the substeps to arrive at the system calibration. For example, calibration of the AR system 500 can be divided into varifocal calibration, illuminator calibration, display calibration, image capture device calibration, see-through calibration, and eye-tracking calibration. Dividing AR system 500 calibration into substeps is further described and illustrated below with reference to FIG. 7.

In this example, FIG. 5 depicts five light paths illustrating the components involved in calibration substeps. Light path 520 illustrates the image capture devices 108 observing real-world 3D position 512, with a calibration substep involving the image captures devices 108 and calibration targets representing real-world 3D points. Light path 522 illustrates the eyeball cameras 506 (e.g. representing a user's eyes) observing real-world 3D position 512 through combiner 505, with a "see-through" calibration substep involving eyeball cameras 506, combiner 505, and calibration targets representing real-world 3D points. Light path 524 illustrates eyeball cameras 506 observing a pixel of varifocal display 548 as reflected by combiner 505 and projected from the same angle into the entrance pupil of eyeball cameras 506 such that it overlays real-world 3D position 512, with both "varifocal" and "display" calibration substeps involving eyeball cameras 506, combiner 505, and varifocal display 548. Light path 526 illustrates eye-tracking cameras 214 observing a user's pupil as well as glints on a user's cornea from illuminators 116 as reflected by combiner 505 and also reflected by hot mirror 504, with "eye-tracking" calibration substeps involving eye-tracking cameras 214, a backlit calibration target positioned in place of a user's eyes (e.g. or in place of the eyeball cameras 506), combiner 505, and hot mirror 504. Light path 528 illustrates eyeball cameras 506 observing glints of the illuminators 116 reflected from the eyeball cameras 506 and reflected back to the eyeball cameras 506 from the varifocal display 548 via the combiner 505 from illuminators 116 as reflected by combiner 505, with "illuminator" calibration substeps (e.g. to determine illuminators 116 poses relative to the eyeball cameras 506 or alternatively a user's eyes) involving eyeball cameras 506, combiner 505, varifocal display 548, and illuminators 116.

Figure 6:
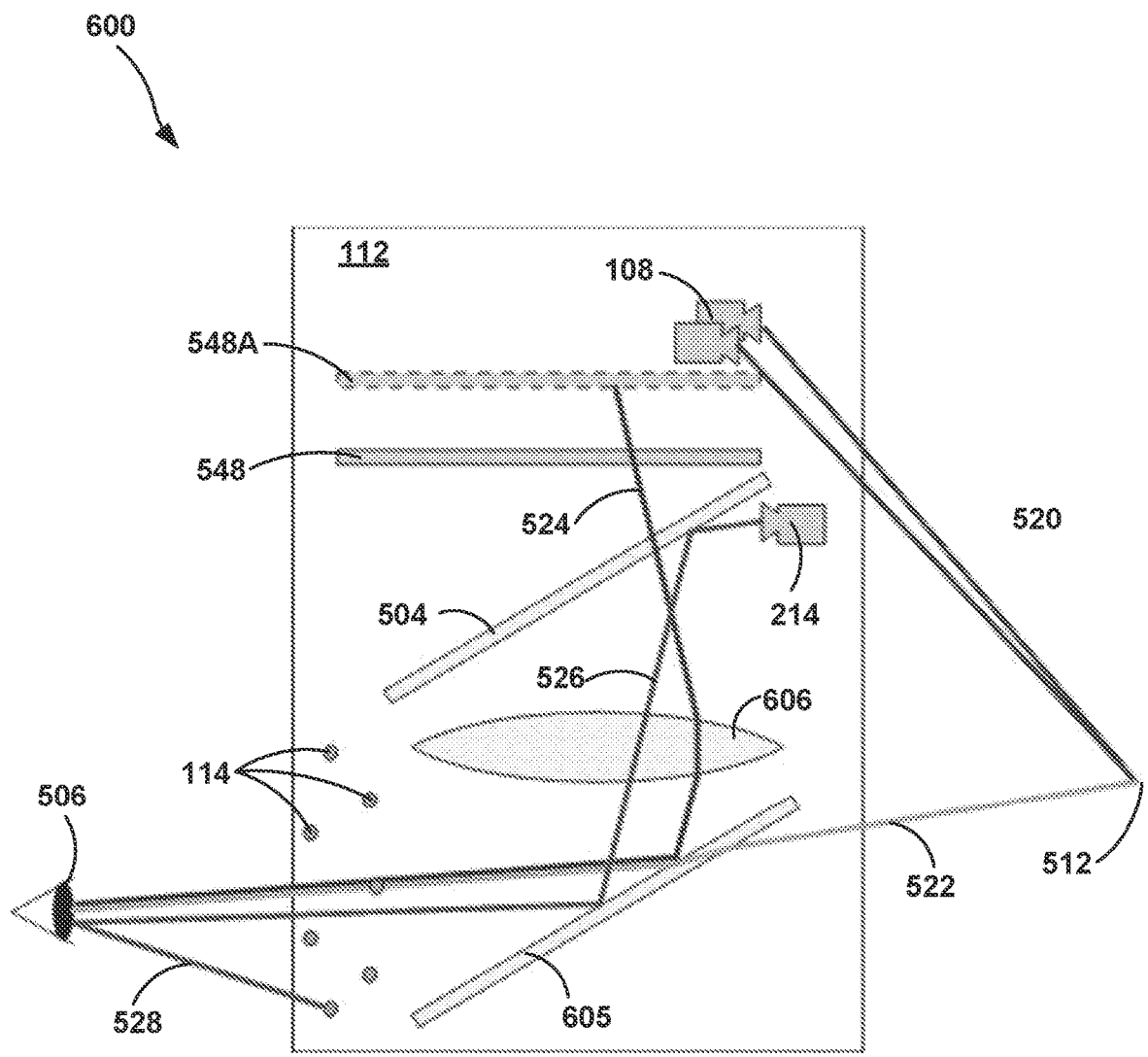
FIG. 6 is a schematic illustration of another AR system depicting raycast-based calibration of optical components of an example HMD, in accordance with techniques described in this disclosure.

FIG. 6 is a schematic illustration of another AR system 600 depicting raycast-based calibration of optical components of an example HMD 112, in accordance with techniques described in this disclosure. In the example shown, the AR system 600 includes eyeball cameras 506, HMD 112, and real-world 3D position 512. In the example shown, HMD 112 includes a varifocal display 548, image capture devices 108, illuminators 116, eye-tracking cameras 214, hot mirror 504, lens 606, and a flat optical combiner 605.

The example AR system 600 illustrated in FIG. 6 is similar to the AR system 500, with curved combiner 505 being replaced by flat combiner 605 and lens 606. For example, lens 606 includes the optical power to magnify varifocal display 548 from the user's perspective and combiner 605 redirects light from varifocal display 548 to the user's eyes (e.g. or the eyeball cameras 506). In some examples, a flat combiner such as combiner 605 has the advantage of minimizing distortion of the real-world scene viewed by the user (or eyeball cameras 506) through the combiner 605, which only introduces a small shift to the real-world scene proportional to the index of refraction, thickness, and angle of the combiner 605. Use of a flat combiner such as combiner 605 necessitates a lens to magnify varifocal display 548 to the user. As such, the use of a curved combiner such as combiner 505 is the removal of the need for lens 606, reducing the number of components needed in the system and the space and added complexity required in mounting a magnifier, such as lens 606.

Figure 7:
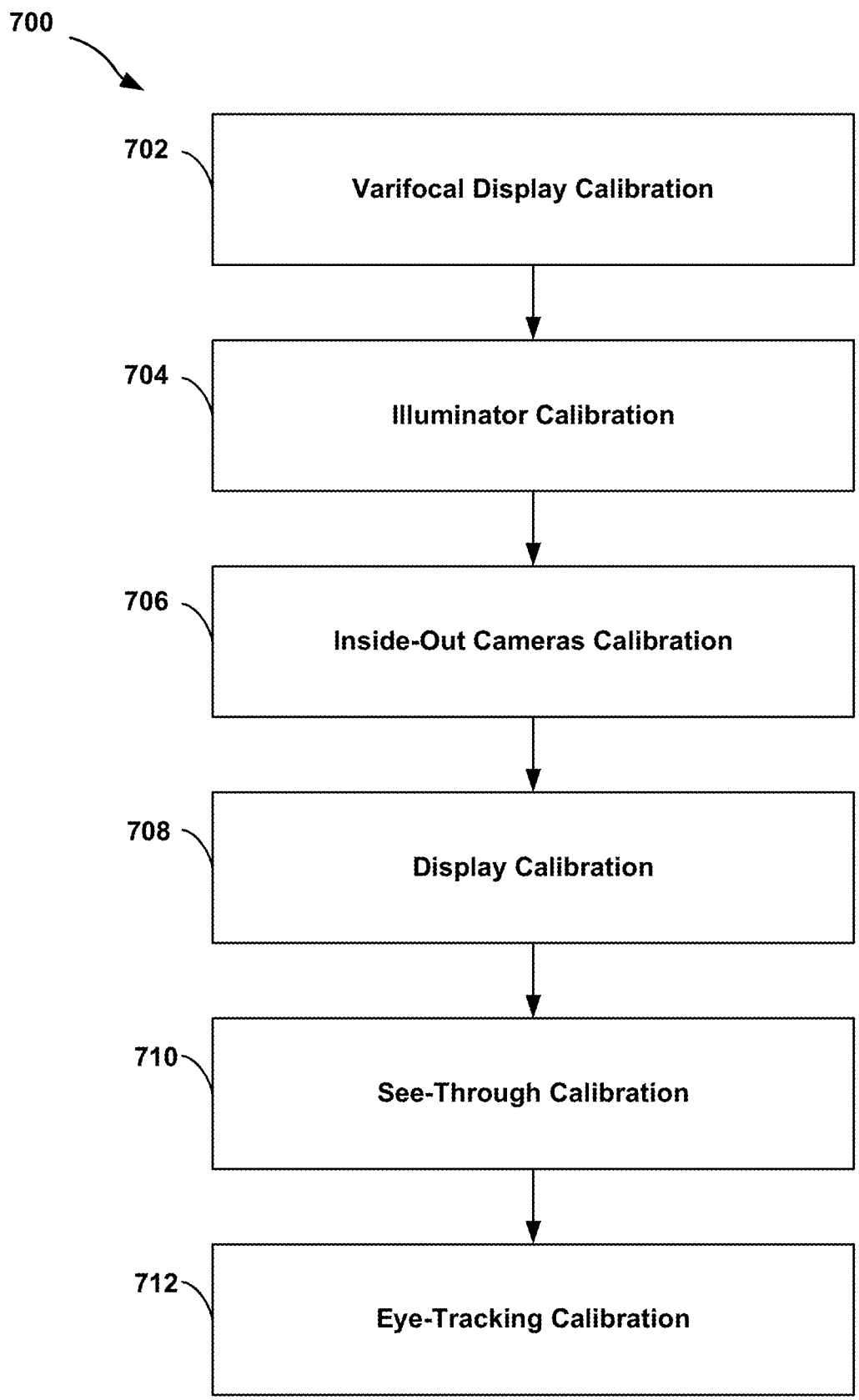
FIG. 7 is a flow chart illustrating an example operation of calibrating a HMD, in accordance with the techniques of the disclosure.

FIG. 7 is a flow chart illustrating an example operation of calibrating a HMD, in accordance with the techniques of the disclosure. The example operation is described with respect to HMD 112 of FIGS. 2A-6.

A fixture composed of a pair of reference cameras (e.g. eyeball cameras 506) on a single-axis reference translational stage may be used for both varifocal display calibration (702) and illuminator calibration (704). HMD 112 may be mounted in front of eyeball cameras 506 such that the optical center of eyeball cameras 506 are approximately at the nominal pupil center of a user's eyes.

At varifocal display calibration step 702, eyeball cameras 506 capture a sequence of rendered images from varifocal display 548. The sequence of rendered images may be a sequence of checkerboard patterns having varying sizes (e.g. spatial resolutions) of checkerboard patterns. The temporal sequence of intensity of each pixel of varifocal display 548 forms a grey code, and eyeball cameras 506 pixels can be associated to grey codes according to the sequence that the eyeball cameras 506 pixels observe. As such, correspondences between the eyeball cameras 506 and varifocal display 548 are built from a plurality of different eyeball cameras 506 views and a plurality of varifocal (e.g. focal depth) positions. From the correspondences, the relative pose among the eyeball cameras 506, combiner 505, and varifocal display 548 at the plurality of varifocal positions can be estimated. In addition, form errors of the inner surface of the combiner 505 can be estimated from the correspondences. In some examples, a multi-view varifocal raycast calibration algorithm is used to determine the correspondences, as discussed further below with respect to FIGS. 8-9.

At illuminator calibrations step 704, illuminators 116 are turned on and eyeball cameras 506 capture images of varifocal display 548 including reflections of illuminators 116 at the same plurality of varifocal positions as varifocal calibration. Because the eyeball cameras 506 directly observe varifocal display 548, the illuminators 116 pose relative to the eyeball cameras 506 can be jointly estimated along with the eyeball cameras 506 pose relative to combiner 505 and varifocal display 548 using bundle adjustment.

A fixture composed of a pair of reference cameras (e.g. eyeball cameras 506) on a six-joint robot arm may be used for inside-out cameras calibration (706), display calibration (708), and see-through calibration (710). HMD 112 may be mounted to the six-joint robot arm in a fixed position relative to the eyeball cameras 506 and in front of eyeball cameras 506 such that the optical center of eyeball cameras 506 are approximately at the nominal pupil center of a user's eyes. The robot may be located in a calibration room or area where lights can be turned on and off and the robot may be surrounded by calibration targets.

At inside-out cameras 108 calibration step 706, the lights in the calibration room or area are turned on, and the inside-out cameras 108 capture a series of measurements of the surrounding calibration targets as the six-joint robot arm moves along a predetermined trajectory. In addition, motion sensors 206 (e.g. IMUs) capture a series of measurements as the robot arm moves along the predetermined trajectory.

At display calibration step 708, the lights in the calibration room or area are turned off, and the eyeball cameras 506 captured calibration images rendered on the varifocal display 548. Similar to the varifocal calibration step 702, correspondences between the eyeball cameras 506 and varifocal display 548 are determined from the captured images, and the relative pose among the eyeball cameras 506, combiner 505, and varifocal display 548 can be estimated from the correspondences and using the combiner 505 deformation estimated at the varifocal calibration step 702. In some examples, a single-view raycast calibration algorithm is used to determine the correspondences, as discussed further below with respect to FIGS. 10-11.

At see-though calibration step 710, the lights in the calibration room or area are turned on, and images of the surrounding calibration targets are captured by both the eyeball cameras 506 and the inside-out cameras 108. Correspondences between the eyeball cameras 506, combiner 505, inside-out cameras 108, and surrounding calibration targets are determined from the captured images, and the relative pose among the eyeball cameras 506 and the surrounding calibration targets can be estimated from the correspondences and using the results of the inside-out cameras 108 calibration step 706 and the display calibration step 708. In some examples, a single-view raycast calibration algorithm is used to determine the correspondences, as discussed further below with respect to FIGS. 10 and 12.

A fixture composed of a backlit calibration target mounted at a fixed position relative to the HMD 112 and at the nominal eye relief of the HMD 112 may be used for eye-tracking cameras 214 calibration step 712.

At the eye-tracking cameras 214 calibration step 712, a single image capture of the backlit calibration target is acquired. In some examples, the eye-tracking calibration optical system is symmetric to the display calibration system, e.g. as a "mirror image" of the display calibration system, as illustrated and further discussed below with respect to FIGS. 13-14. Similar to the display calibration step 708, correspondences between the eye-tracking cameras 214 and the backlit calibration target are determined from the captured images, and the relative pose among the eye-tracking cameras 214, combiner 505, and the backlit calibration target can be estimated from the correspondences and using the combiner 505 deformation estimated at the varifocal calibration step 702. In some examples, a single-view raycast calibration algorithm is used to determine the correspondences, as discussed further below with respect to FIGS. 14-15.

Figure 8:
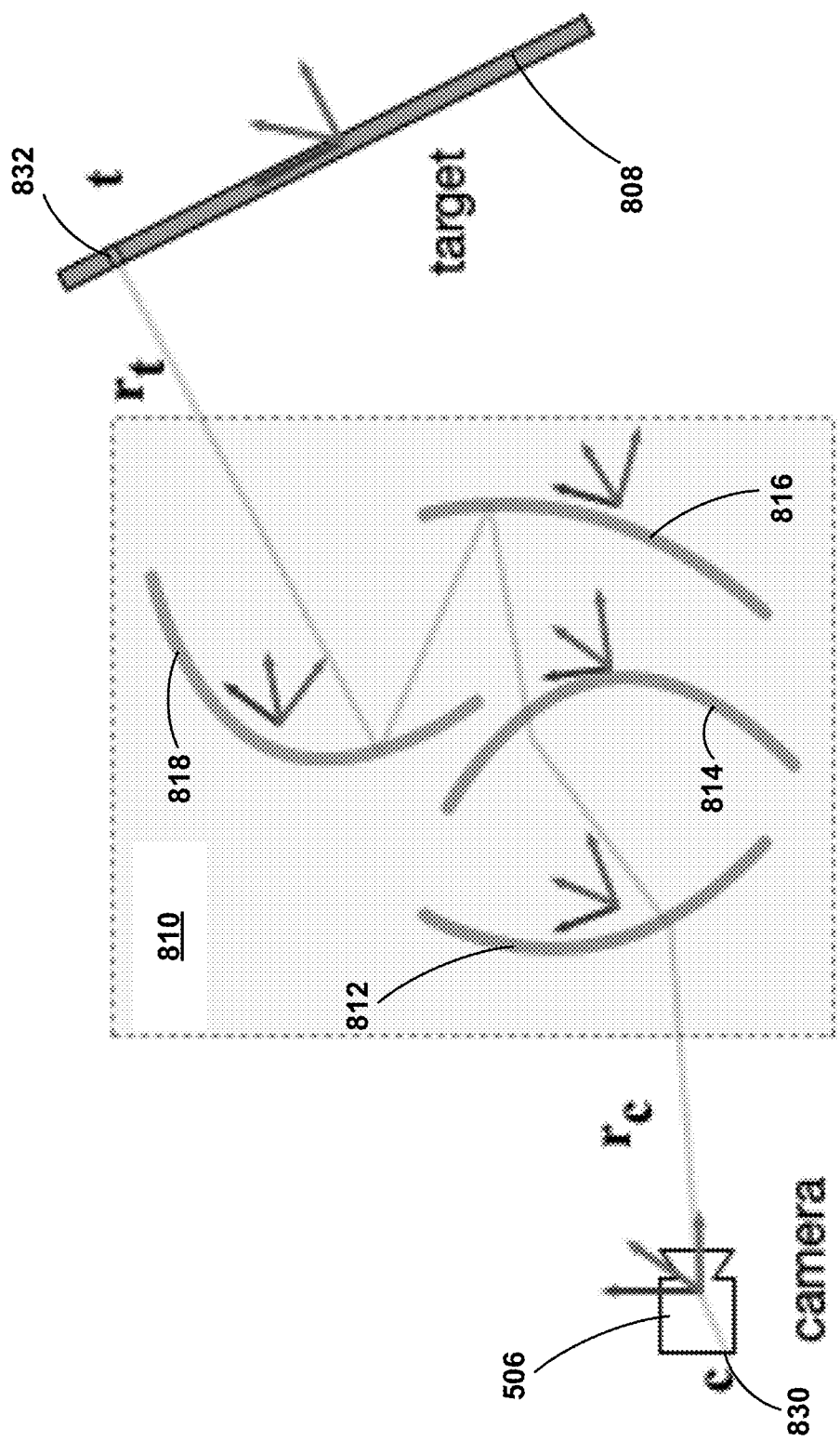
FIG. 8 illustrates a conceptual diagram illustrating raycasting of an example HMD, in accordance with techniques described in this disclosure.

In some examples, calibration of an AR system, such as the AR systems 500 or 600, may include raycasting, e.g. building a model of an optical system via raycasting, or building a "raycast model." For example, the steps 702, 708, 710, and 712 of the calibration operation 700 each include some form of raycasting. FIG. 8 illustrates a conceptual diagram illustrating raycasting of an example optical system, e.g. an HMD 112, in accordance with techniques described in this disclosure. FIG. 8 includes camera 806, optical system 810 including refractive or reflective surfaces 812-818, and a target 808.

In the example shown, a raycast optical model considers camera 806 looking at some target through optical system 810. In some examples, the optical system 810 can include part, or all, of HMD 112. The optical system 810 may include one or more refractive or reflective surfaces 812-818. For example, refractive or reflective surfaces 812-818 may include combiner 505 or combiner 605. The optical system can be fully specified by the n-tuple T of equation (1):

$$\Theta = (\kappa, S_1, \ldots, S_N, T_{C:T}) \quad (1)$$

where $\kappa$ denotes intrinsic parameters of the camera, $S_j$ denotes the j-th refractive or reflective surface 812-818, and $T_{C:T}$ denotes the pose of the target 808 plane with regard to the camera 806. Each refractive or reflective surface 812-818, e.g. $S_j$, can be further specified by a triplet $(z_j; \gamma_j; T_{C:Sj})$, where $z_j$ defines the sag of the refractive or reflective surface 812-818, $\gamma_j$ refers to the ratio of refractive indices before and after the surface, and $T_{C:Sj}$ encodes the pose of refractive or reflective surface 812-818 with regard to camera 806. The sag $z_j$ is defined as a combination of a quadratic base shape and a Zernike sequence to represent typical freeform optics, such as shown in equation (2):

$$z(x, y) = q(x, y; c, k) + \sum_{i=1}^{n} \alpha_i b_i(x, y) \quad (2)$$

The parameters c and k defines the curvature and conic of the quadratic base shape of the first term of equation (2). The coefficient vector $\alpha$ of the second term, e.g. the Zernike term, of equation (2) defines the free-form deviations of the refractive or reflective surface 812-818 shape from its base quadratic shape. The geometric distortion between the camera and the target is defined by the chief ray, e.g. the light path through the optical center of the pupil of camera 808. In some examples, reverse ray tracing from camera 806 pixel to target 808 position may be easier or preferable to forward ray tracing.

In the example shown in FIG. 8, the mapping from a pixel 830, e.g. c, of camera 806 to a point 832, e.g. t, on the target 808 plane can be defined by equation (3):

$$t = \text{raycast}(c; \Theta) \quad (3)$$

where $\Theta$ represents optical system 810. In some examples, raycasting is initiated by using the intrinsic parameters $\kappa$ of the camera 806 to trace a ray from pixel 830 to the chief ray $r_c$ at the entrance pupil of camera 806. The chief ray $r_c$ is then tra'ced through the optical system 810 to the ray $r_r$. For example, the tracing of $r_c$ through the optical system 810 can take the form of the iterative function of equation (4):

$$r_{j+1} = T_{C:j} \text{deflect}(T_{C:j}^{-1} r_j; z_j; \gamma_j) \quad (4)$$

Specifically, the refraction function deflect( ) reflects or refracts the ray $r_{j+1}$ in the local frame of optical surface $(z_j; \gamma_j)$. The transform $T_{C:j}$ converts between the local coordinate frame of camera 806 and the optical surface, such that ray deflection can be represented as independent of the poses. The deflect( ) function is implemented in two sub-steps: (1) compute ray intersection with the sag, and (2) compute ray deflection according to laws of physics, e.g. reflecting and/or refracting at each surface.

The target point 832 is then computed as the intersection between the final ray, $r_r$, and the target 808 plane, for example, by equation (5):

$$t = \text{intersect}(r_r, T_{C:T}) \quad (5)$$

where $T_{C:T}$ is the relative pose between camera 806 and target 808.

In some examples, images rendered on a display, such as the varifocal display 548 of AR systems 500 or 600, may be "distorted" in order to present a "straightened" image to the user through the optics of the HMD 112, e.g. rendering an image distorted the opposite of the distortions imparted by the optics of the HMD 112. To determine the distortion through the optical system 810, and therefore the correct compensation distortion with which to render images, projections from the display, e.g. target points, may be projected through the optical system 810 to camera 806 pixels. In some examples, tracing rays from a target point 832 to a camera pixel 830 cannot be analytically computed in optical systems of freeform sags. Projection can be computed by searching for the camera pixel 830 that minimizes reprojection error on the target 808 plane, such as by equation (6):

$$\text{raytrace}(t; \Theta) = \arg\min_c |\text{raycast}(c; \Theta) - t|^2 \quad (6)$$

In some examples, Newton iterations over the chief ray rc, and projecting to the camera pixel 830 using the projection model.

In some examples, camera pixel 830 may not be able to "see", or intersect with, any point on target 808 because the ray cannot intersect with any refractive or reflective surface 812-818 of optical system 810. In such cases, a visibility term can be introduced to aid in convergence of raycasting algorithms by forcing high errors for such "invisible" rays. For example, for $A_n$ representing all points on the n-th refractive or reflective surface 812-818, the visibility term according to equation (7) can be formulated:

$$a_n(r) = \min_{p \in r, q \in A_n} |p - q| \quad (7)$$

where $a_n(r)$ is the nearest point of ray intersection within the jth aperture and can be included in raycasting algorithms as an additive term to the minimization problem of the algorithm. As such, a camera pixel 830 is "visible" to aperture j if $a_n(r_n) = 0$, and "invisible" otherwise.

In some embodiments, calibration of an AR system, e.g. the AR systems 500 or 600, can include a single-view raycast calibration algorithm. For example, the display calibration step 708 and eye-tracking calibration step 712 of the operation 700 may include a single-view raycast calibration algorithm. In some examples, a single-view raycast algorithm takes the camera-target correspondences acquired by a camera, e.g. the eyeball cameras 508 and/or eye-tracking cameras 214, and outputs an estimate parameter set $\theta$, which can be a partial or full representation of the optical system $\Theta$. For example, a full representation of the optical system $\Theta$ can be constructed from the estimated parameter set $\theta$ and an additional set of parameters $\eta$, for example, $\Theta(\tau, \eta)$. In some examples, the additional parameters $\eta$ may be acquired from a computer aided design (CAD) model, or from other calibration steps.

In some examples, a single-view raycast calibration algorithm uses the minimization problem of equation (8) to estimate the parameter set $\Theta$ of the optical system 810:

$$\min_\theta \sum_P \left| \text{raycast}(c_p, \Theta(\theta, \eta)) - t_p \right|^2 \quad (8)$$

$$\text{s.t. } \forall\, p, n: a_P(c_P) = 0$$

In some examples, raycasting is computationally cheaper than raytracing, and the reprojection error may be measured in the target 808 plane. In some examples, the constrained minimization problem of equation (8) may be difficult to solve, and the relaxed unconstrained minimization problem of equation (9) may be used:

$$\min_{\Theta}\Sigma_p|e(c_p,t_p;\Theta(\theta,\eta))|^2 + \Sigma_p\Sigma_n|a_n(c_p,\Theta(\theta,\eta))|^2 \quad (9)$$

where the reprojection error takes into account both visible and invisible pixels:

$$e(c, t; \Theta) = \begin{cases} \text{raycast}(c_p, \Theta) - t_p & \forall\, n{:}a_n(c_p, \Theta) = 0 \\ \tau & \text{otherwise} \end{cases} \quad (10)$$

The constant $\tau$ in equation (9) penalizes invisible pixels. In some examples, an optimization algorithm can be used to solve the unconstrained minimization problem of equation (9), for example, Ceres Solver using a Levenberg-Marquart algorithm. In some examples, the single-view raycast algorithm may converge in less than 10 iterations.

In some examples, a multi-view raycast calibration algorithm may be used, for example, when camera 806 observes target 808 from multiple views and target 808 may move relative to the optical system 810. In some examples, multi-view raycasting may be the sum of M single-view raycasts, where M is the number of camera 806 views times the number of target 808 positions. The multi-view raycast calibration algorithm is then summered over all M single-view raycasts at the M camera 806 views and target 808 positions:

$$\min_{\Theta}\Sigma_m\Sigma_p|e(c_p,t_p;\Theta(\theta,\eta))|^2 + \Sigma_m\Sigma_p\Sigma_n|a_n(c_p,\Theta(\theta,\eta))|^2 \quad (11)$$

In some examples, the shared structure of the optical system 810 among the plurality of camera 806 views and target 808 positions can be utilized to reduce the dimensionality of the estimated parameters.

Figure 9:
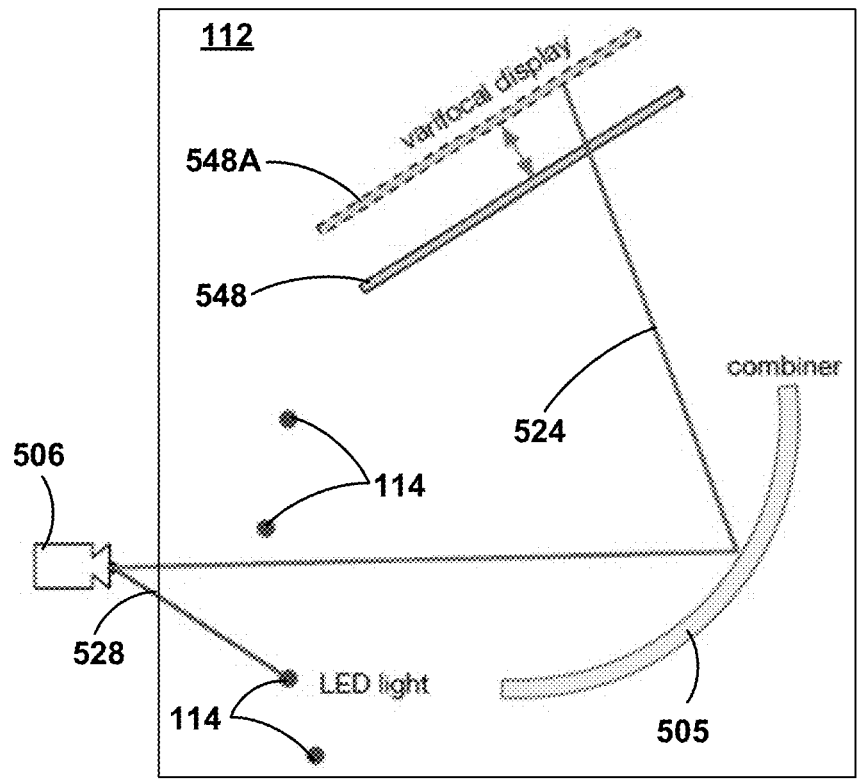
FIG. 9 is a schematic illustration depicting raycast-based calibration of components involved in varifocal and illuminator calibration of an example HMD, in accordance with techniques described in this disclosure.

Varifocal display calibration, e.g. step 702 of FIG. 7, will be described with reference to both FIGS. 9-10 concurrently. FIG. 9 is a schematic illustration depicting raycast-based calibration of components involved in varifocal and illuminator calibration of an example HMD 112, in accordance with techniques described in this disclosure. In the examples shown, FIG. 9 includes the eyeball cameras 506 mounted on a single-axis reference translational stage and placed in front of HMD 112 with the optical center of the eyeball cameras 506 at the nominal pupil center of a user's eyes. The HMD 112 components illustrated include the varifocal display 548, combiner 505, and illuminators 114.

Figure 10:
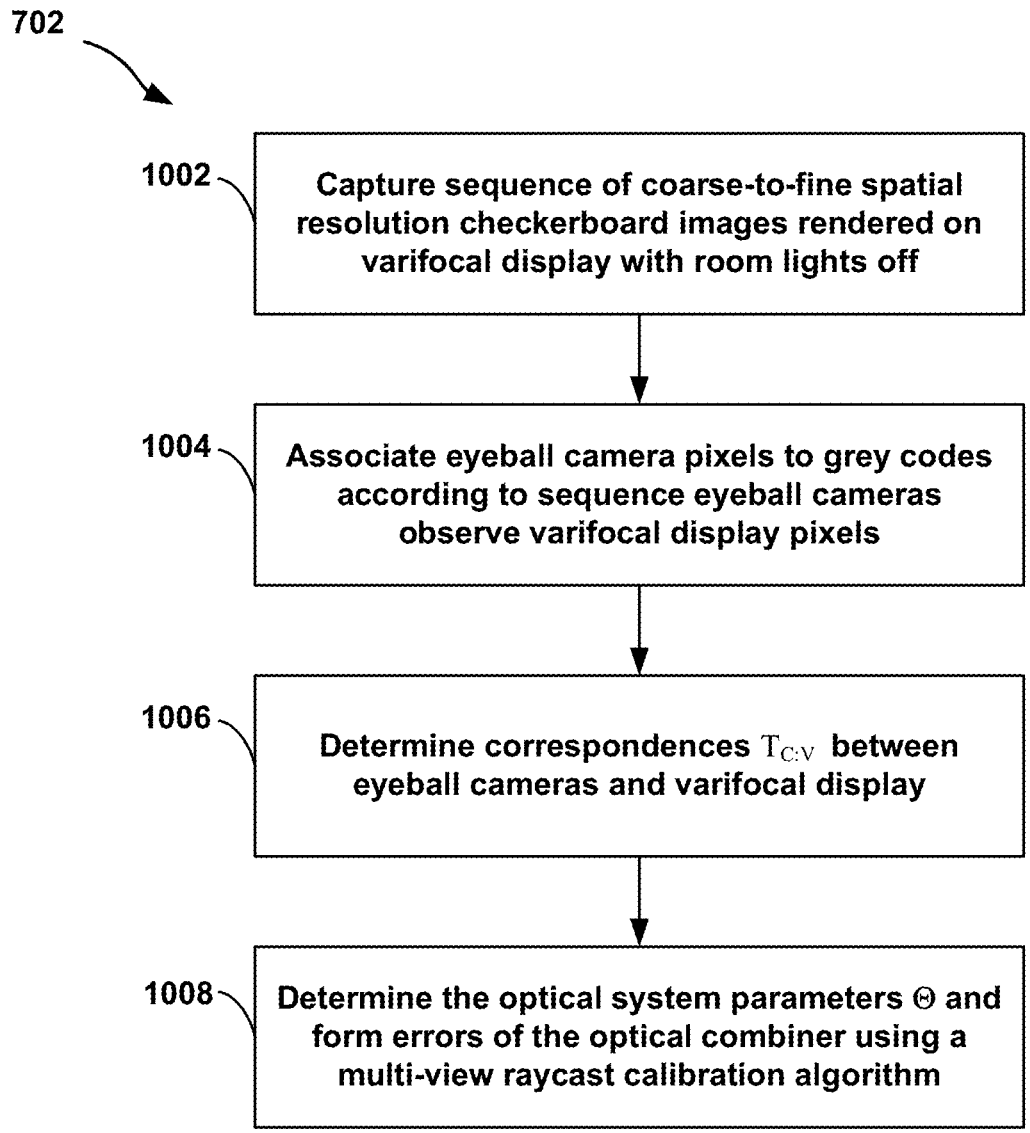
FIG. 10 is a flowchart illustrating an example operation of varifocal calibration of a HMD, in accordance with the techniques of the disclosure.

FIG. 10 is a flow chart illustrating an example operation of varifocal calibration 702 of HMD 112, in accordance with the techniques of the disclosure.

At step 1002, a sequence of rendered images from varifocal display 548 are captured by the eyeball cameras. The sequence of rendered images may be a sequence of checkerboard patterns having varying sizes (e.g. spatial resolutions) of checkerboard patterns. In some examples, the sequence of images may be captured for K eyeball cameras 506 positions and L varifocal display 548 positions. For example, the sequence of images may be captured for K=three different eyeball camera views (e.g. translating the eyeball cameras between views via the translation stage) and at L=two varifocal settings (e.g. at the two apparent depths illustrated in FIG. 8 at 548 and 548A) for each view (e.g. M=6 sequences of checkerboard patterns).

At step 1004, the temporal sequence of intensity of each varifocal display 548 pixel forms a grey code, and eyeball cameras 506 pixels may be associated with the grey codes, according to the sequence that the eyeball cameras 506 pixels observe the varifocal display 548 pixels. For example, the grey code can include the unique detector response of each pixel of the eyeball cameras 506 associated with the brightness characteristics of each varifocal display 548 pixel viewable by the respective eyeball cameras 506 pixels at the plurality of varifocal positions and eyeball cameras 506 views. In some examples, the grey codes may encode correspondences between the eyeball cameras 506 and the varifocal display 548, for example, $T_{C:V}$ in equation (1) above, where V (varifocal display) is the target T.

At step 1006, the correspondences between the eyeball cameras 506 and varifocal display 548 $T_{C:V}$ per equation (1) above (e.g. where the varifocal display 548 "V" is the target "T") are built from a plurality of different eyeball cameras 506 views and a plurality of varifocal (e.g. focal depth) positions.

At step 1008, a multi-view varifocal raycast calibration algorithm, for example according to equations (10) and (11) discussed above, is used to determine the optical system parameters $\Theta$ for the components of the varifocal system of the AR system 500 or 600.

For example, for K eyeball cameras 506 positions and L varifocal display 548 positions, K×L raycasts models can be determined. In other words, the for the k-th eyeball cameras 506 positions at the l-th varifocal display 548 position, the raycast model is described by $\Theta_{k,l}$ ($\kappa$, $S_1 = (z_1, \gamma_1, T_{Ck:S1})$, $T_{Ck:V1}$), as described above with respect to equations (1) and (2), and where $S_1$ is the "inner" surface of the combiner 505, e.g. the surface of reflection of the combiner 505 as illustrated by the raypath 524. The pose of the target 1, e.g. the varifocal display 548, relative to the camera k, e.g. the eyeball cameras 506, can be decomposed into $T_{Ck:V1} = T_{Ck:S1} T_{S1:V1}$. As a result, only K+L unknown extrinsics need to be estimated.

In addition, form errors of the inner surface of the combiner 505 can be estimated from the determined optical system parameters $\Theta$, e.g. the Zernike sequence of equation (4) discussed above. For example, the sag of combiner 505 or lens 606 may vary from the model due to manufacturing errors, assembly errors, environmental change, etc. The sag model of equation (2) can be relaxed to the sag model of equation (12):

$$z_1(x, y) = \hat{z}_1(x, y) + \sum_{i=1}^{n} \beta_{1,i} b_i(x, y) \quad (12)$$

Where $\hat{z}_1$ denotes the sag fo the inner combiner surface in a CAD model. The form error of the surface is accounted for by the Zernike sequence on the right side summation term of equation (12), and is controlled by the vector $\beta_1$. As such, in some examples, K=L extrinsics may be estimated via multi-view varifocal raycast calibration at the step 1008, e.g. $\theta = (\beta_1, T_{C1:S1}, \ldots, T_{CK:S1}, T_{S1:V1}, \ldots, T_{S1:VL})$.

Figure 11:
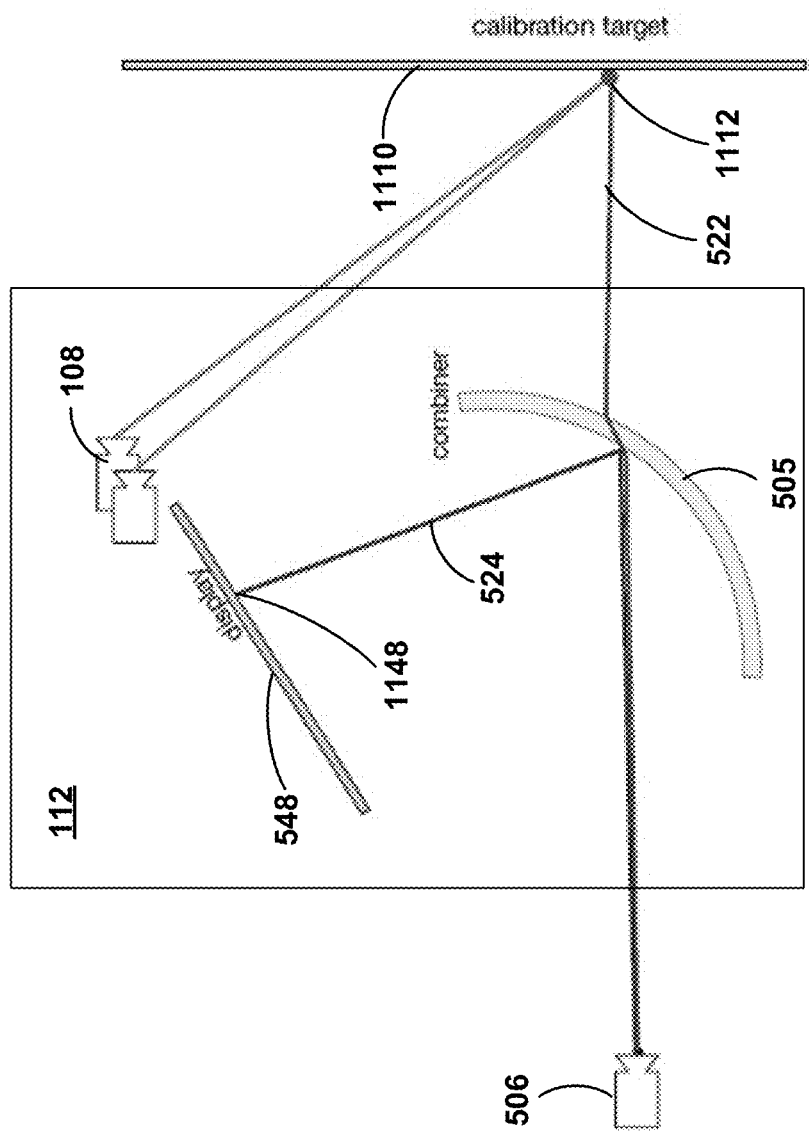
FIG. 11 is a schematic illustration depicting raycast-based calibration of components involved with inside-out cameras calibration, display calibration, and see-through calibration of an example HMD, in accordance with techniques described in this disclosure.

Display calibration and see-through calibration, e.g. steps 708 and 710 of FIG. 7, respectively, will be described with reference to FIGS. 11-13 concurrently. FIG. 11 is a schematic illustration depicting raycast-based calibration of components involved in inside-out cameras 108 calibration, display calibration, and see-through calibration of an example HMD 112, in accordance with techniques described in this disclosure. In the examples shown, FIG. 11 includes HMD 112 mounted on a six-joint robot arm in front of, and in a fixed position relative to, eyeball cameras 506 such that the optical center of eyeball cameras 506 are approximately at the nominal pupil center of a user's eyes. In the example shown, HMD 112 includes combiner 505, display 548 (e.g. varifocal display 548 at a fixed varifocal position during calibration), and inside-out cameras 108. FIG. 11 also includes calibration target 1110 including calibration target point 1112 that corresponds to, e.g. overlaps with, display pixel 1148 via combiner 505 via the perspective of the eyeball cameras 506.

Figure 12:
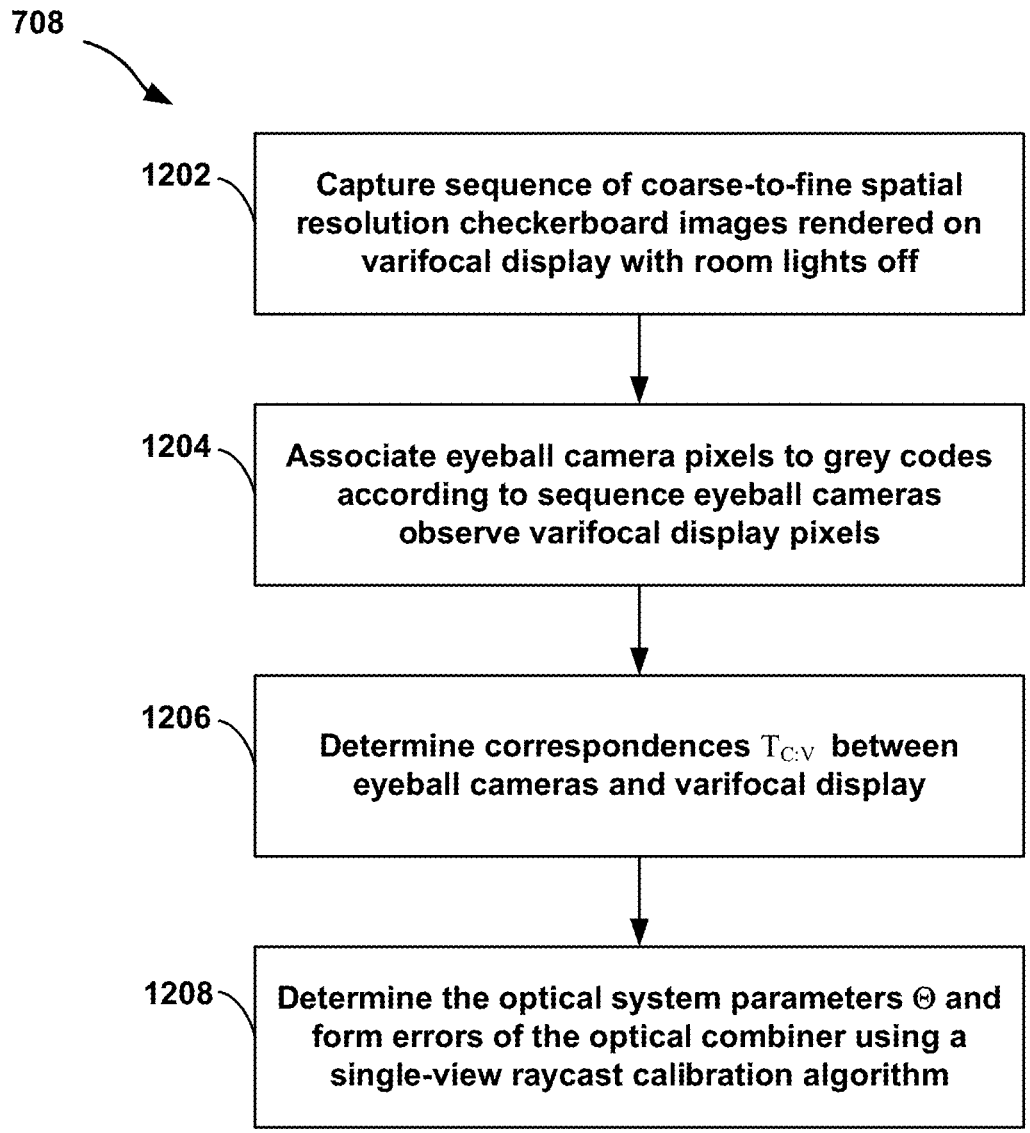
FIG. 12 is a flowchart illustrating an example operation of display calibration of a HMD, in accordance with the techniques of the disclosure.

FIG. 12 is a flow chart illustrating an example operation of display calibration 708 of a HMD 112, in accordance with the techniques of the disclosure.

At display calibration step 1202, the lights in the calibration room or area are turned off, and the eyeball cameras 506 captured calibration images rendered on the varifocal display 548. In some examples, the varifocal position of the varifocal display 548 may be different from the varifocal positions of the varifocal calibration 702, in other examples the position may be the same.

At step 1204, the temporal sequence of intensity of each varifocal display 548 pixel forms a grey code, and eyeball cameras 506 pixels may be associated with the grey codes, according to the sequence that the eyeball cameras 506 pixels observe the varifocal display 548 pixels. For example, the grey code can include the unique detector response of each pixel of the eyeball cameras 506 associated with the brightness characteristics of each varifocal display 548 pixel viewable by the respective eyeball cameras 506 pixels. In some examples, the grey codes may encode the correspondences between the eyeball cameras 506 and the varifocal display 548, for example, $T_{C:V}$ in equation (1) above, where V (varifocal display) is the target T.

At step 1206, the correspondences between the eyeball cameras 506 and varifocal display 548 $T_{C:V}$ per equation (1) above (e.g. where the varifocal display 548 "V" is the target "T") are built from the calibration images captured.

At step 1208, a single-view varifocal raycast calibration algorithm, for example according to equations (9) and (10) discussed above with respect to FIG. 8, is used to determine the optical system parameters Θ for the components of the display system of the AR system 500 or 600 illustrated in FIG. 11. For example, since the eyeball cameras 506 and the varifocal display 548 are mounted in fixed positions relative to each other, the optical system is specified by Θ=(κ, $S_1$=($z_1$, $γ_1$, $T_{C:S1}$), $T_{C:V}$). In some examples, the eyeball cameras 506 intrinsics κ and the combiner 505 sag $z_1$, including form errors (e.g. equation (12) above), are known from varifocal calibration 702. Accordingly, only two extrinsics need to be estimated, namely, θ=($T_{C:S1}$, $T_{C:V}$).

Figure 13:
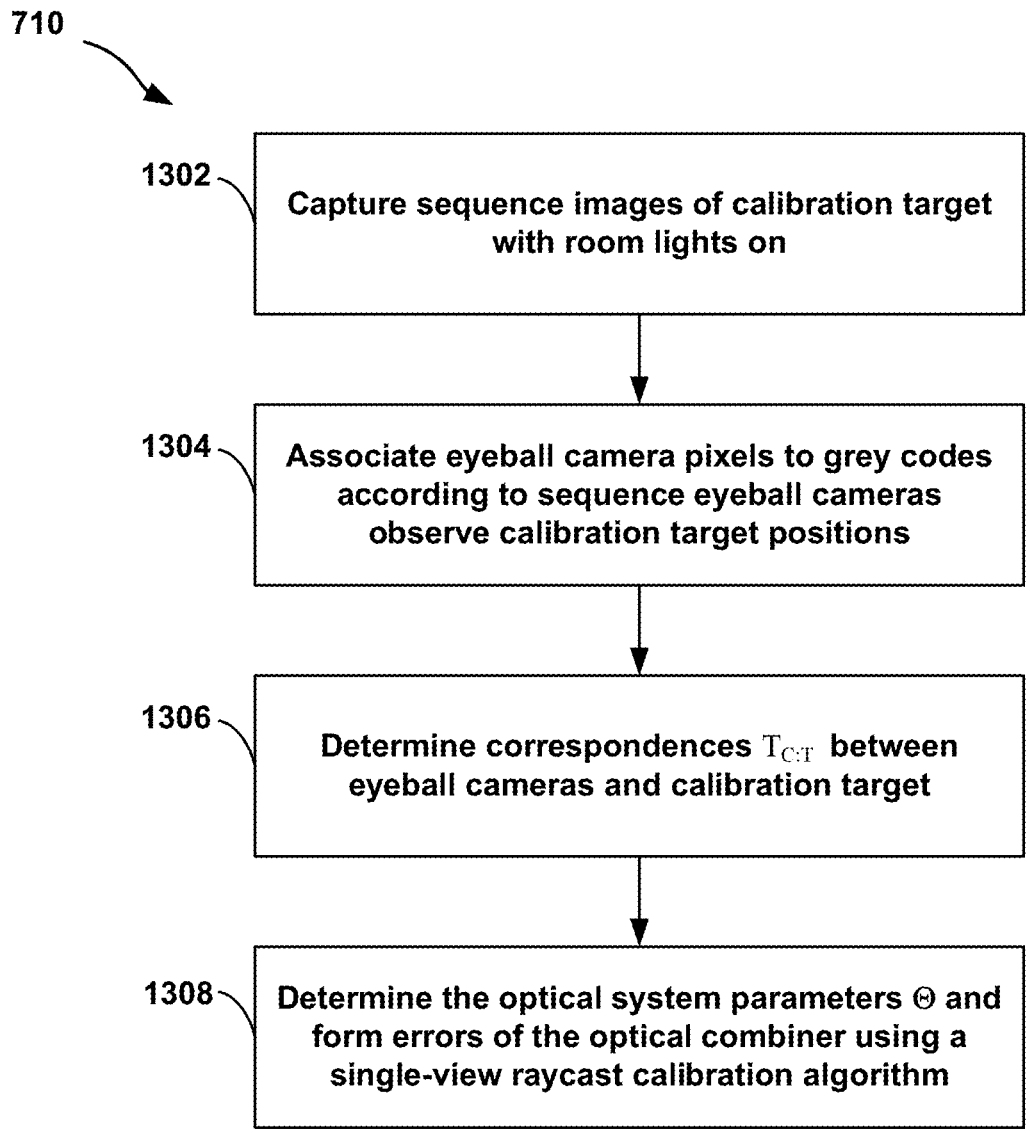
FIG. 13 is a flowchart illustrating an example operation of see-through calibration of a HMD, in accordance with the techniques of the disclosure.

FIG. 13 is a flow chart illustrating an example operation of see-through calibration 710 of a HMD 112, in accordance with the techniques of the disclosure.

At see-through calibration step 1302, the lights in the calibration room or area are turned on, and the eyeball cameras 506 captured calibration images of calibration target 1110, e.g. viewing calibration target 1110 through both surfaces of the combiner 505.

At step 1304, the temporal sequence of intensity of each calibration target 1110 position forms a grey code, and eyeball cameras 506 pixels may be associated with the grey codes, according to the sequence that the eyeball cameras 506 pixels observe the calibration target 1110 For example, the grey code can include the unique detector response of each pixel of the eyeball cameras 506 associated with the brightness characteristics of each calibration target 1110 position viewable by the respective eyeball cameras 506 pixels. In some examples, the grey codes may encode the correspondences between the eyeball cameras 506 and the calibration target 1110, for example, $T_{C:T}$ in equation (1) above, where T represents the calibration target 1110.

At step 1306, the correspondences between the eyeball cameras 506 and calibration target 1110 $T_{C:T}$ per equation (1) above are built from the calibration images captured.

At step 1308, a single-view raycast calibration algorithm, for example according to equations (9) and (10) discussed above with respect to FIG. 8, is used to determine the optical system parameters Θ for the components of the display system of the AR system 500 or 600 illustrated in FIG. 11. For example, since the eyeball cameras 506 observe calibration target 1110 through both surfaces of combiner 505, at each frame (e.g. each observation position of the six-joint robot arm for see-through calibrations performed at multiple robot positions and HMD 112 perspective of the calibration target 1110), the optical system is specified by the tuple $Θ_f$=(κ, $z_1$, $γ_1$, $T_{C:S1}$, $z_2$, $γ_2$, $T_{C:S2}$, $T_{C:Tf}$). In some examples, see-through calibration may be performed after both varifocal calibration 702 and display calibration 708. As such, the eyeball cameras 506 intrinsics κ and the combiner 505 sag $z_1$, including form errors (e.g. equation (12) above), are known. In some examples, the combiner 505 material and optical properties (e.g. refractive indices $γ_1$, $γ_2$) are known. In addition, the thickness of the combiner 505, e.g. $T_{S1:S2}$, can be determined from the known sag and form error of the first surface $z_1$ and by determining the sag and form error of the second surface $z_2$. For example, similar to equation (12) above, the form error of the second surface of combiner 505 can be estimated via a Zernike sequence with coefficient $β_2$. In some examples, see-through calibration may also be performed after inside-out cameras calibration, e.g. step 706. As such, the relative poses of the HMD 112, including eyeball cameras 506 and combiner 505, and the calibration target 1110 are known via the previous inside-out calibration and display calibration, and $T_{IO:Tf}$ can be estimated for each frame, where IO represents the inside-out cameras 108. For example, $T_{C:Tf}$ can be decomposed via $T_{C:Tf}$=$T_{C:IO}$ $T_{IO:Tf}$. Accordingly, the single-view raycast algorithm estimates the optical system parameters θ=($T_{C:IO}$, $β_2$).

Figure 14:
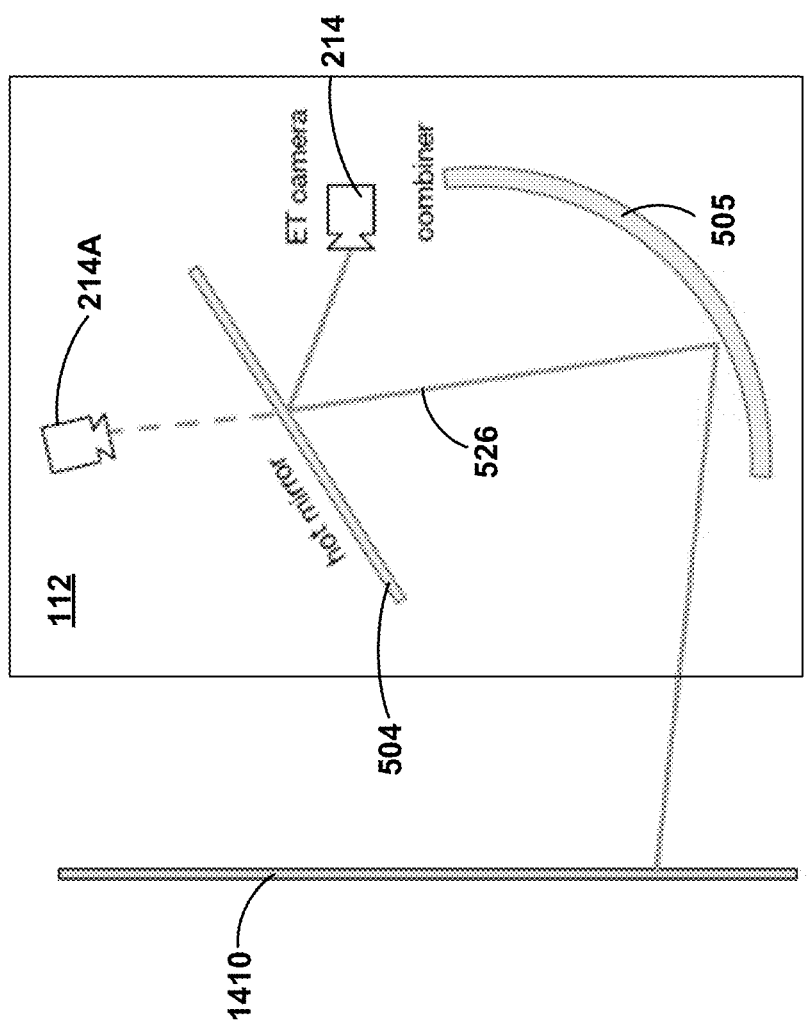
FIG. 14 is a schematic illustration depicting raycast-based calibration of components involved in eye-tracking calibration of an example HMD, in accordance with techniques described in this disclosure.

Eye-tracking calibration, e.g. step 712 of FIG. 7, will be described with reference to FIGS. 14-15 concurrently. FIG. 14 is a schematic illustration depicting raycast-based calibration of components of an example HMD 112, in accordance with techniques described in this disclosure. In the examples shown, FIG. 14 includes a backlit calibration target 1410 mounted at a fixed position relative to a HMD 112 and at the nominal eye relief of HMD 112. In the example shown, HMD 112 includes combiner 505, hot mirror 504, and eye-tracking cameras 214.

Figure 15:
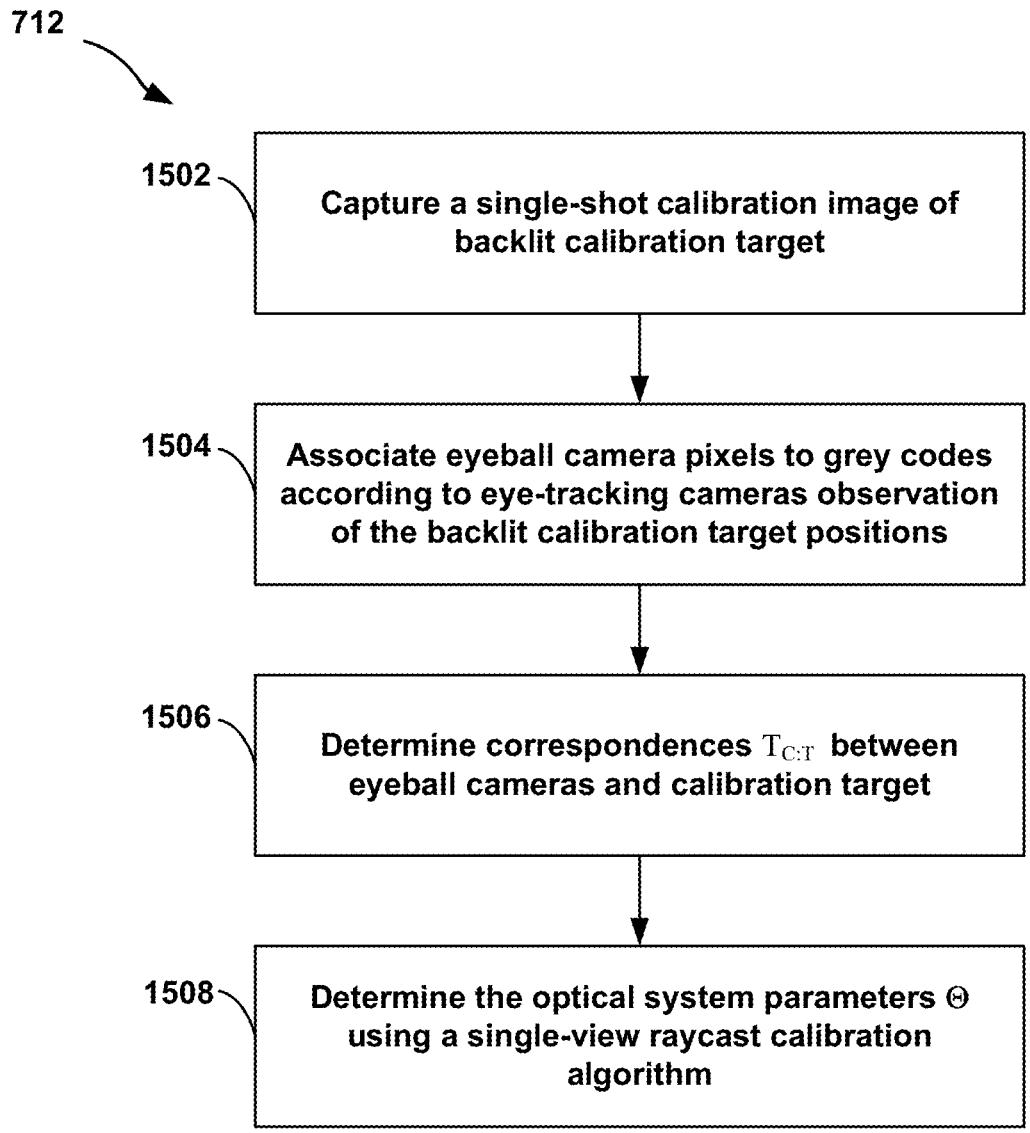
FIG. 15 is a flow chart illustrating an example operation of eye-tracking calibration of a HMD, in accordance with the techniques of the disclosure.

FIG. 15 is a flow chart illustrating an example operation of eye-tracking calibration 712 of a HMD 112, in accordance with the techniques of the disclosure.

At display calibration step 1502, eye-tracking cameras 214 capture a single-shot calibration image of the backlit calibration target 1410 through the optical system, namely, via reflections from hot mirror 504 and combiner 505. In some examples, the images are in the infrared wavelength spectrum.

At the step 1504, the intensity of each position of the backlit calibration target 1410 forms a grey code, and eye-tracking cameras 214 pixels may be associated with the grey codes. For example, the grey code can include the unique detector response of each pixel of the eye-tracking cameras 214 associated with the brightness characteristics of each backlit calibration target 1410 position viewable by the respective eye-tracking cameras 214 pixels. In some examples, the grey codes may encode the correspondences between the eye-tracking cameras 214 and the backlit calibration target 1410, for example, $T_{C:T}$ in equation (1) above, where C represents the eye-tracking cameras 214 and T represents the backlit calibration target 1410.

At step 1506, the correspondences between the eye-tracking cameras 214 and backlit calibration target 1410 $T_{C:T}$ per equation (1) above are built from the calibration image captured.

At step 1508, a single-view raycast calibration algorithm, for example according to equations (9) and (10) discussed above with respect to FIG. 8, is used to determine the optical system parameters $\Theta$ for the components of the display system of the AR system 500 or 600 illustrated in FIG. 14. In the example shown, eye-tracking calibration shows a similar optical configuration as display calibration, e.g. with the virtual eye-tracking cameras 214A positioned similarly to varifocal display 548 in display calibration 708 (e.g. as illustrated in FIG. 11) and viewing the backlit calibration target 1410 positioned similarly to eyeball cameras 506 in display calibration 708 via reflection from the combiner 505. However, in some examples, eye-tracking calibration differs from display calibration because the intrinsics of the eye-tracking cameras 214 are non-trivial to calibrate once eye-tracking cameras 214 are assembled into HMD 112. As such, at step 1508 the single-view raycast calibration algorithm estimates both the eye-tracking cameras intrinsic and extrinsic parameters $\theta=(\kappa, T_{C:S1}, T_{C:T})$. In some examples, there may be unresolvable ambiguity between the image center of eye-tracking cameras 214 and the pose of the eye-tracking cameras 214, e.g. with nearly linear cameras being used. In addition, camera intrinsics models often use polynomials to represent distortions, and a high-order distortion model may be prone to overfitting, leading to erroneous distortion coefficients. In some examples, a penalization term may be added to a camera intrinsics model to bias the optical center of the eye-tracking cameras 214 towards one half of the image size, and the distortion coefficients may be biased towards zeros.

Figure 16:
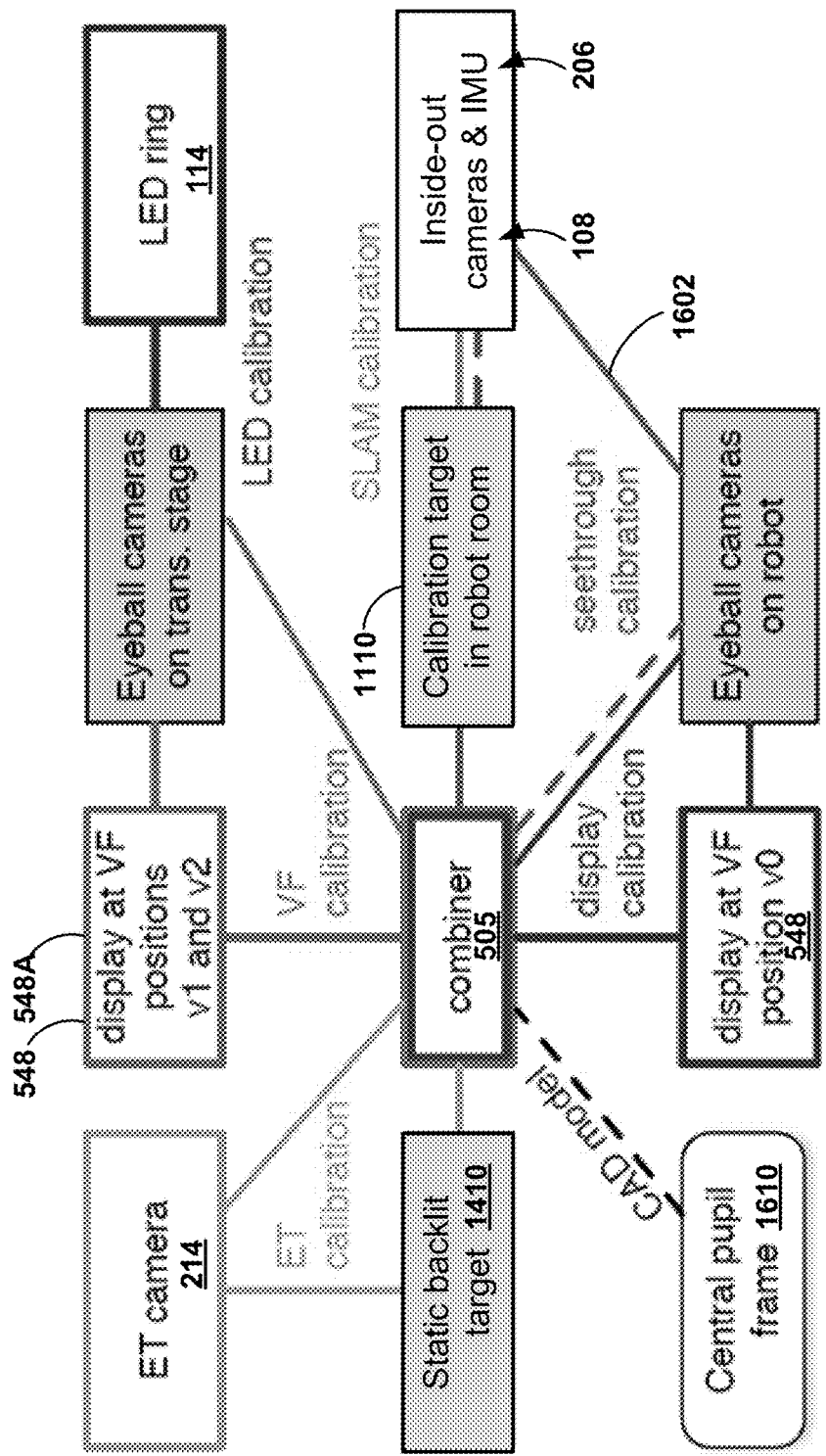
FIG. 16 is a block diagram depicting example relationships between raycast-based calibration substeps, in accordance with techniques described in this disclosure.

FIG. 16 is a block diagram depicting example relationships between raycast-based calibration substeps, in accordance with techniques described in this disclosure. The example shown in FIG. 16 includes several HMD 112 components, namely combiner 505, varifocal display 548 at position v0 during display calibration, varifocal display 548, 548A at positions v1 and v2 during varifocal calibration, illuminators 114, inside-out cameras 108, and motion sensors 206. The example shown also includes calibration components used in the various calibration sub steps, namely static backlight calibration target 1410, eyeball cameras 506 on a single-axis translation stage mount, eyeball cameras 506 on the six-joint robot arm, and calibration target 1110.

The example shown in FIG. 16 illustrates how each calibration step (e.g. of FIG. 7) connects components of the HMD 112 by their relative poses, in some examples. In some examples, the relative pose between any two components may be computed by chaining the poses along the paths illustrated in FIG. 16. For example, the pose between the inside-out cameras 108 and the combiner 505 can be computed by $T_{IOC:Comb}=T_{IOC:EC} T_{EC:Comb}$, e.g. the path 1602 in the example shown (e.g. IOC=inside-out cameras; Comb=combiner; EC=eyeball cameras).

In the example shown, all of the HMD 112 components may be anchored to a central pupil frame 1610 (CPF). CPF 1610 may be a virtual frame denoting the middle point between the two nominal eyeball frames of a HMD 112 user.

At the end of a calibration workflow, e.g. after completing the operation 700 illustrated in FIG. 7, all poses of each of the components (e.g. each component represented by "X") may be transferred to CPF 1610 by $T_{CPF:X}=T_{CPF:S1,L} T_{S1,L:X}$, where $S_{1,L}$ denotes the local coordinate system of the inner surface of the combiner 505.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), metal programmable gate arrays (MPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Further details are described in the Appendix attached hereto.

What is claimed is:

1. A method of calibrating an optical system comprising:
determining a plurality of correspondences between a plurality of target points of a target and a plurality of camera pixels of one or more cameras based on one or more images of the target acquired by the camera through an optical system, the optical system including a plurality of optical surfaces and an optical combiner, wherein each of the plurality of optical surfaces is defined by a difference of optical index on opposing sides of the surface, wherein the plurality of target points comprise a plurality of target points at a plurality of focal depths; and
determining at least one calibration parameter for the optical system by mapping a plurality of rays from each of the plurality of camera pixels to each of the plurality of target points via raytracing through the optical system, wherein the raytracing is based on the index differences of the plurality of optical surfaces, the shapes of the plurality of optical surfaces, and the positions of the plurality of optical surfaces relative to the one or more cameras.

2. The method of claim 1, wherein determining at least one calibration parameter comprises determining a distortion parameter associated with the optical system.

3. The method of claim 1, wherein determining at least one calibration parameter comprises determining one or more intrinsic parameters associated with the components of the optical system.

4. The method of claim 1, wherein determining at least one calibration parameter comprises:
determining a relative pose among the one or more cameras, the optical combiner, and the target based on the plurality of correspondences and the mapping of the plurality of rays.

5. The method of claim 1, wherein determining at least one calibration parameter comprises:
determining a physics-based calibration model from the raytracing through the optical system; and
computing the calibration parameter from the calibration model.

6. The method of claim 5, wherein determining a physics-based calibration model from the raytracing comprises:
determining a corresponding shape of each of the optical surfaces;
determining the mapping of the plurality of rays through the optical system based on the determined shapes of each of the optical surfaces; and
determining the calibration model based on the mapping of the plurality of rays.

7. The method of claim 6, wherein determining a corresponding shape of each of the optical surfaces includes determining an inner surface shape of the optical combiner, wherein the inner surface is disposed towards the one or cameras based on the one or more images.

8. The method of claim 7, further comprising determining the thickness and outer surface shape of the optical combiner based on the inner surface shape.

9. The method of claim 1, wherein the one or more images of the target are acquired at a plurality of camera positions and a plurality of target positions.

10. The method of claim 1, further comprising:
determining the visibility of the plurality of target points to the plurality of camera pixels through the optical system; and
weighting the raytracing through the optical system based on the visibility.

11. The method of claim 10, wherein the visibility is determined based on the intersection of the plurality of rays with each of the plurality of optical surfaces.

12. The method of claim 1,
wherein the optical system is an optical system of a head mounted display (HMD) of an augmented reality system, and
wherein the combiner comprises an off-axis reflective combiner of the HMD.

13. A system comprising:
a device comprising at least one image capture device; and
a processor executing a calibration engine configured to:
determine a plurality of correspondences between a plurality of target points of a target and a plurality of camera pixels of one or more cameras based on one or more images of the target acquired by the camera through an optical system, the optical system including a plurality of optical surfaces and an optical combiner, wherein each of the plurality of optical surfaces is defined by a difference of optical index on opposing sides of the surface, wherein the plurality of target points comprise a plurality of target points at a plurality of focal depths; and
determine at least one calibration parameter for the optical system by mapping a plurality of rays from each of the plurality of camera pixels to each of the plurality of target points via raytracing through the optical system, wherein the raytracing is based on the index differences of the plurality of optical surfaces, the shapes of the plurality of optical surfaces, and the positions of the plurality of optical surfaces relative to the one or more cameras.

14. The method of claim 13, wherein the determination of at least one calibration parameter comprises determining a distortion parameter associated with the optical system.

15. The method of claim 13, wherein determination of at least one calibration parameter comprises determining one or more intrinsic parameters associated with the components of the optical system.

16. The method of claim 13, wherein determination of at least one calibration parameter comprises:
determining a relative pose among the one or more cameras, the optical combiner, and the target based on the plurality of correspondences and the mapping of the plurality of rays.

17. The method of claim 13, wherein determination of at least one calibration parameter comprises:
determining a physics-based calibration model from the raytracing through the optical system; and
computing the calibration parameter from the calibration model.

18. The method of claim 17, wherein determining a physics-based calibration model from the raytracing comprises:
determining a corresponding shape of each of the optical surfaces;

determining the mapping of the plurality of rays through the optical system based on the determined shapes of each of the optical surfaces; and determining the calibration model based on the mapping of the plurality of rays.

19. The method of claim 13, wherein the optical system is an optical system of a head mounted display (HMD) of an augmented reality system, and wherein the combiner comprises an off-axis reflective combiner of the HMD.

20. An augmented reality (AR) system comprising:

a head mounted display (HMD) comprising at least one image capture device;

a processor executing a calibration engine configured to:

determine a plurality of correspondences between a plurality of target points of a target and a plurality of camera pixels of one or more cameras based on one or more images of the target acquired by the camera through an optical system, the optical system including a plurality of optical surfaces and an optical combiner, wherein each of the plurality of optical surfaces is defined by a difference of optical index on opposing sides of the surface, wherein the plurality of target points comprise a plurality of target points at a plurality of focal depths;

determine at least one calibration parameter for the optical system by mapping a plurality of rays from each of the plurality of camera pixels to each of the plurality of target points via raytracing through the optical system, wherein the raytracing is based on the index differences of the plurality of optical surfaces, the shapes of the plurality of optical surfaces, and the positions of the plurality of optical surfaces relative to the one or more cameras.

* * * * *